United States Patent
Göbel

(10) Patent No.: US 12,377,724 B2
(45) Date of Patent: Aug. 5, 2025

(54) RADIATOR SHUTTER FOR MOTOR VEHICLES

(71) Applicant: ADVAL TECH HOLDING AG, Niederwangen (CH)

(72) Inventor: Markus Göbel, Hochdorf (CH)

(73) Assignee: ADVAL TECH HOLDING AG, Niederwangen (CH)

( * ) Notice: Subject to any disclaimer, the term of this patent is extended or adjusted under 35 U.S.C. 154(b) by 311 days.

(21) Appl. No.: 17/779,874

(22) PCT Filed: Nov. 19, 2020

(86) PCT No.: PCT/EP2020/082706
§ 371 (c)(1),
(2) Date: May 25, 2022

(87) PCT Pub. No.: WO2021/104992
PCT Pub. Date: Jun. 3, 2021

(65) Prior Publication Data
US 2022/0410696 A1 Dec. 29, 2022

(30) Foreign Application Priority Data

| | | |
|---|---|---|
| Nov. 26, 2019 | (CH) | 01497/19 |
| Dec. 10, 2019 | (EP) | 19214688 |
| Apr. 2, 2020 | (CH) | 00397/20 |

(51) Int. Cl.
*B60K 11/08* (2006.01)

(52) U.S. Cl.
CPC .................. *B60K 11/085* (2013.01)

(58) Field of Classification Search
CPC .......... B60K 11/085; Y02T 10/88; F01P 7/12; B60Y 2306/15; B60Y 2400/70; B60L 58/26; B60T 5/00
See application file for complete search history.

(56) References Cited

U.S. PATENT DOCUMENTS

| | | | | |
|---|---|---|---|---|
| 4,361,069 A | * | 11/1982 | Peterson ................... | G10B 3/16 84/346 |
| 8,316,812 B2 | * | 11/2012 | Crowley .............. | F02M 35/116 251/249.5 |

(Continued)

FOREIGN PATENT DOCUMENTS

| | | |
|---|---|---|
| DE | 10-2016-224846 A1 | 6/2018 |
| EP | 3 466 738 A1 | 4/2019 |

(Continued)

OTHER PUBLICATIONS

International Search Report of PCT/EP2020/082706 dated Feb. 10, 2021 [PCT/ISA/210].

*Primary Examiner* — Kurt Philip Liethen

(74) *Attorney, Agent, or Firm* — Sughrue Mion, PLLC

(57) ABSTRACT

A radiator shutter for a motor vehicle for controlled engine ventilation, having a frame in which at least two louvres are mounted rotatably to pivot from a closed position to an open position. A motor which drives a single louvre is provided in or on the frame on an engine side of the frame. On the same side is a coupling element which synchronously transmits the rotation of the louvre to the other louvres. A locking disc is provided for each louvre on the mounting side of the frame facing away from the engine side of the frame, in the region of the mounting provided there for the louvres. The locking discs have a form which, if at least one of the locking discs does not rotate synchronously with all the other locking discs, blocks the rotational movement of the locking discs in a force-fitting and form-fitting manner.

18 Claims, 19 Drawing Sheets

(56) References Cited

U.S. PATENT DOCUMENTS

| | | | | |
|---|---|---|---|---|
| 9,077,228 | B2* | 7/2015 | Tanioka | H02K 7/14 |
| 9,758,031 | B2* | 9/2017 | Edwards | B60K 11/085 |
| 10,093,173 | B1* | 10/2018 | Frayer | B60K 11/085 |
| 11,541,744 | B2* | 1/2023 | Lindberg | B29C 48/0021 |
| 2006/0081208 | A1* | 4/2006 | Sturdy | F02D 9/1065 |
| | | | | 123/184.55 |
| 2009/0232489 | A1* | 9/2009 | Viglione | G03B 9/08 |
| | | | | 396/468 |
| 2012/0019025 | A1* | 1/2012 | Evans | B62D 35/005 |
| | | | | 296/193.1 |
| 2014/0335778 | A1* | 11/2014 | Takanaga | B60K 11/085 |
| | | | | 454/333 |
| 2017/0113539 | A1* | 4/2017 | Prior | B60K 11/085 |
| 2020/0223306 | A1* | 7/2020 | Gerber | B60K 11/085 |
| 2021/0339622 | A1* | 11/2021 | Andre | B60K 11/04 |

FOREIGN PATENT DOCUMENTS

| | | |
|---|---|---|
| WO | 2018/029655 A1 | 2/2018 |
| WO | 2019/152520 A1 | 8/2019 |

\* cited by examiner

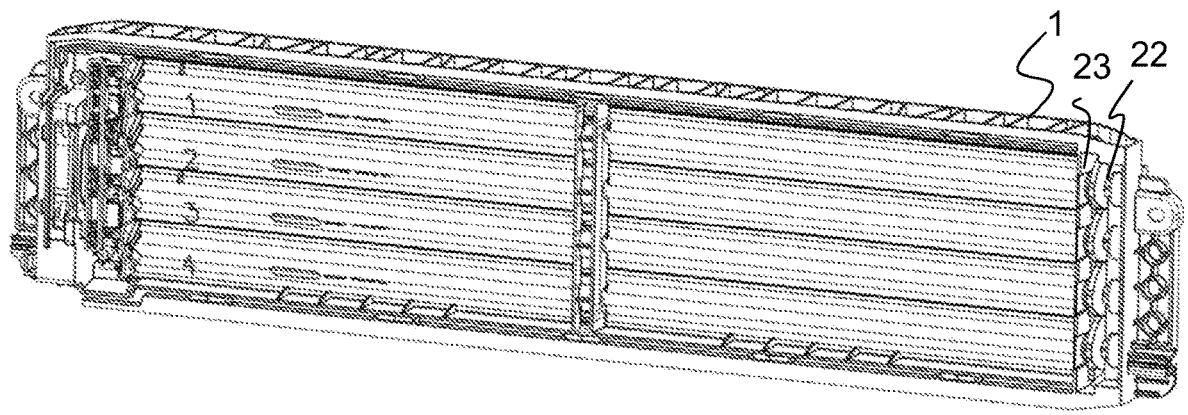
FIG. 5
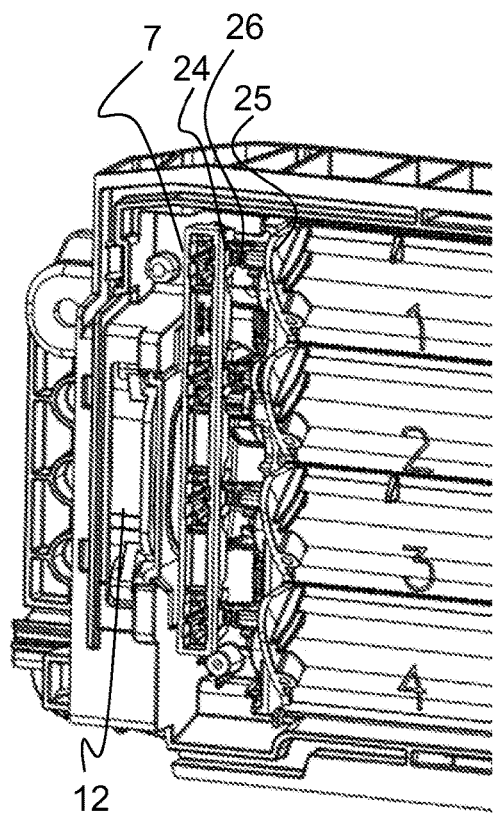 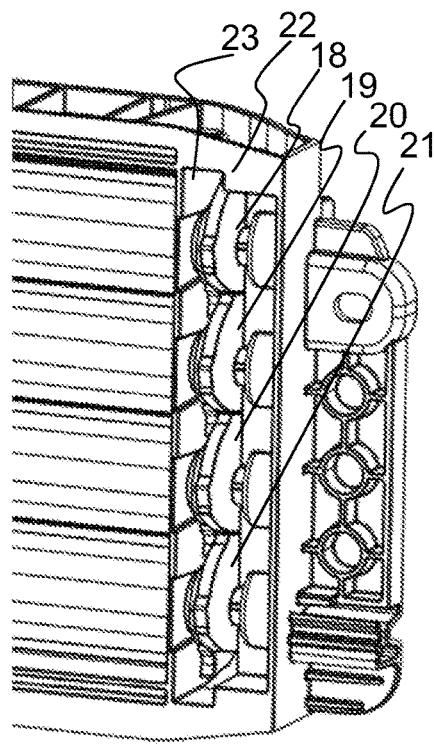
FIG. 6 a)     FIG. 6 b)

Geschlossen (0°)　　　42,5°　　　OFFEN (85°)

Geschlossen (0°)　　　　42,5°　　　　OFFEN (85°)

0° (EV)

12° (EV)

0° (ZV)

12° (ZV)

85° (EV)

42° (EV)

85° (ZV)

42° (ZV)

FIG. 15 a) 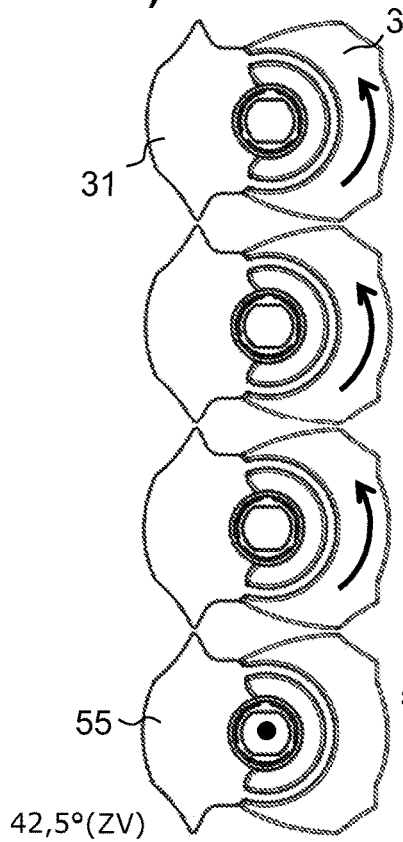 FIG. 15 b) 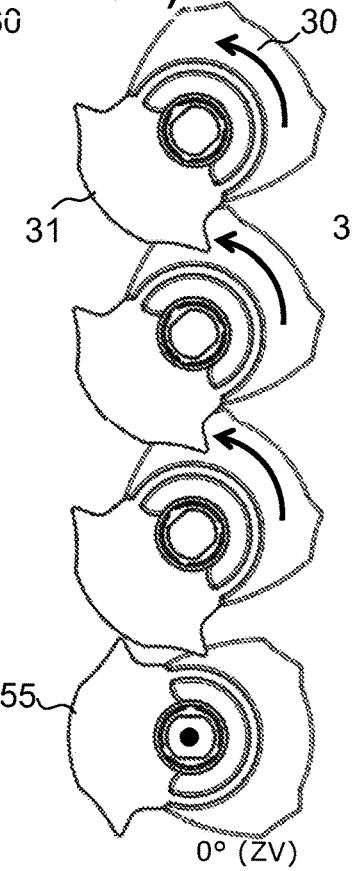 FIG. 15 c) 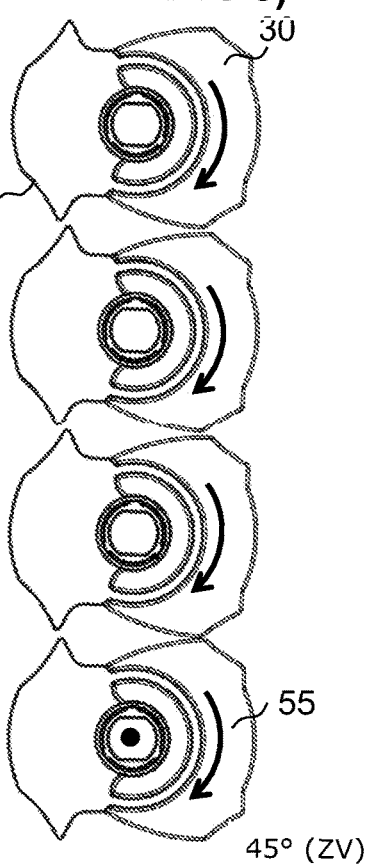
42,5°(ZV)  0° (ZV)  45° (ZV)
FIG. 15 d) 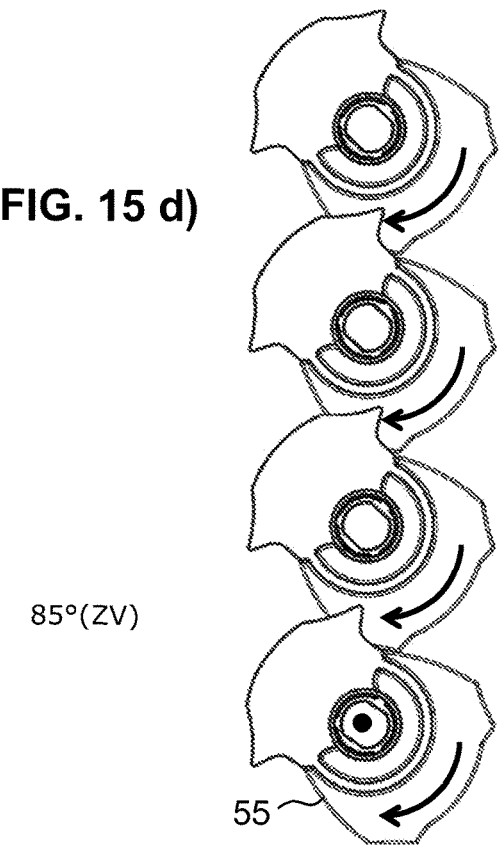 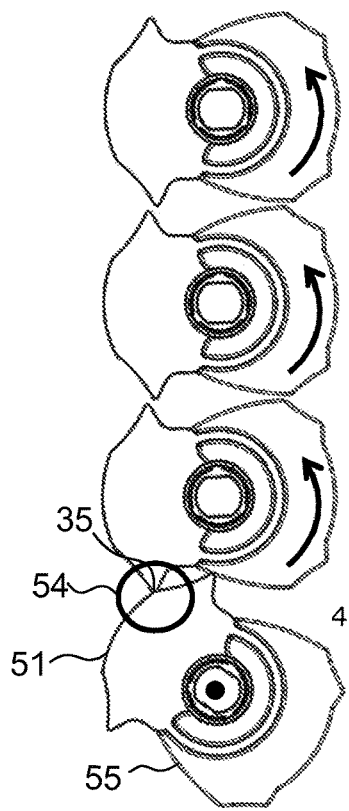 FIG. 15 e)
85°(ZV)  40° nach offen (ZV)

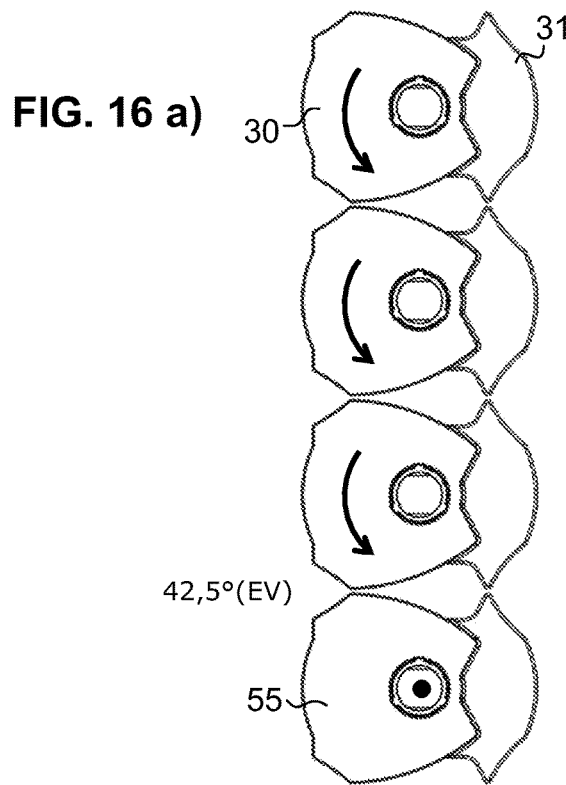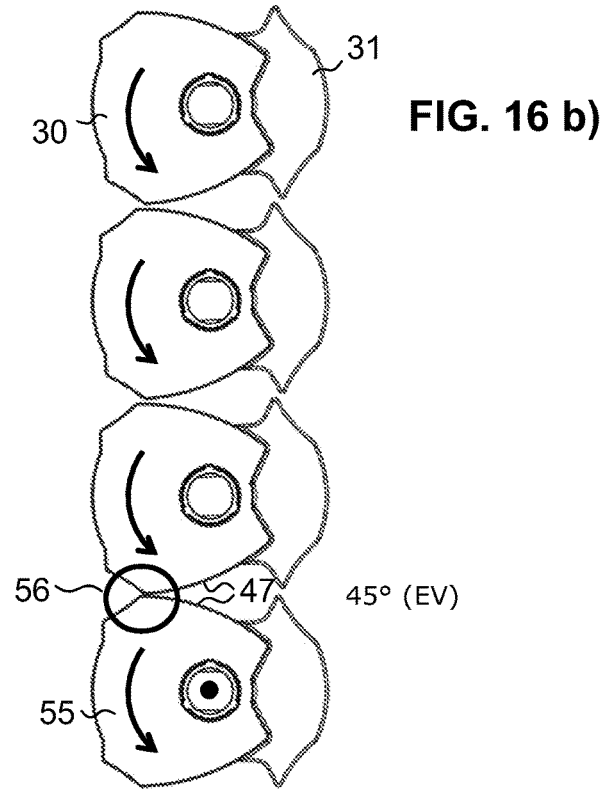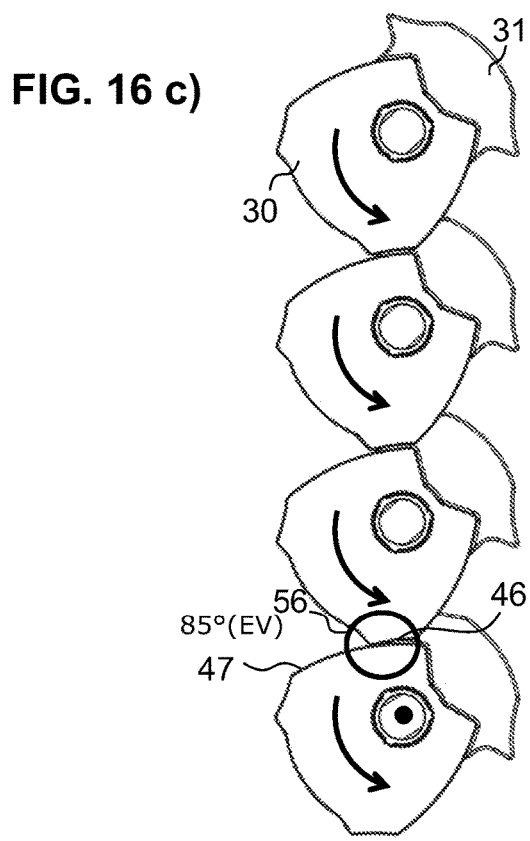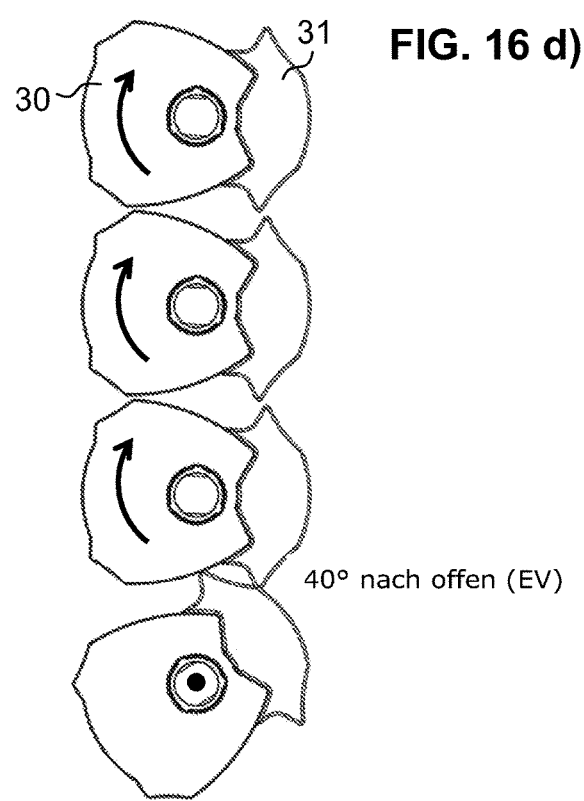

42,5°(ZV)

45° (ZV)

85°(ZV)

40° nach offen (ZV)

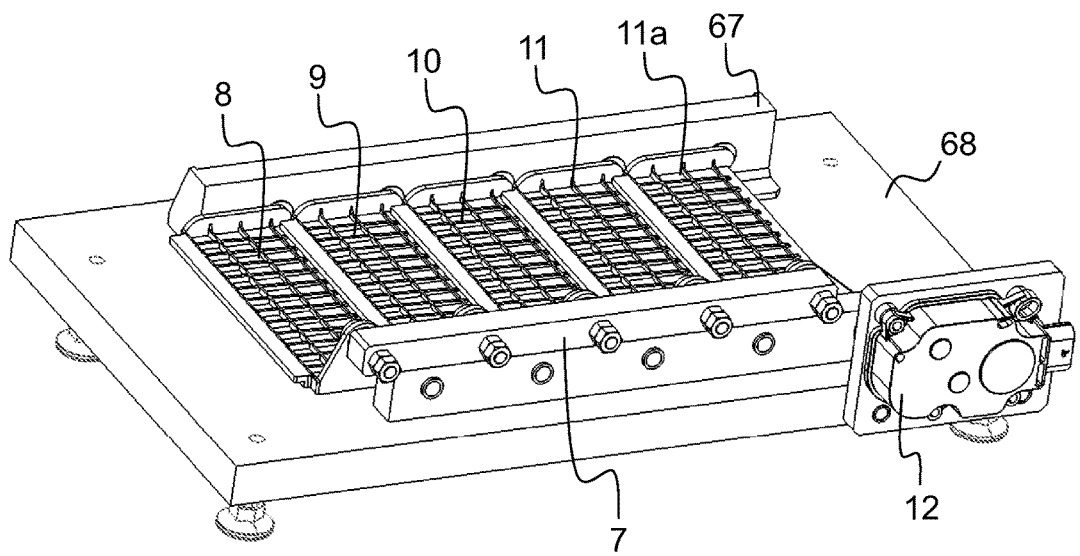
FIG. 18
FIG. 19 a)
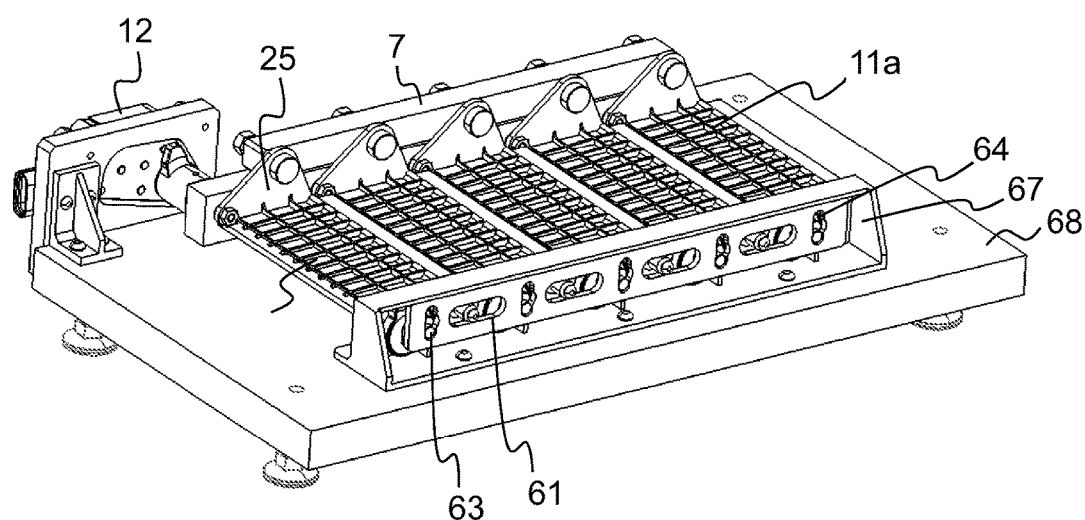

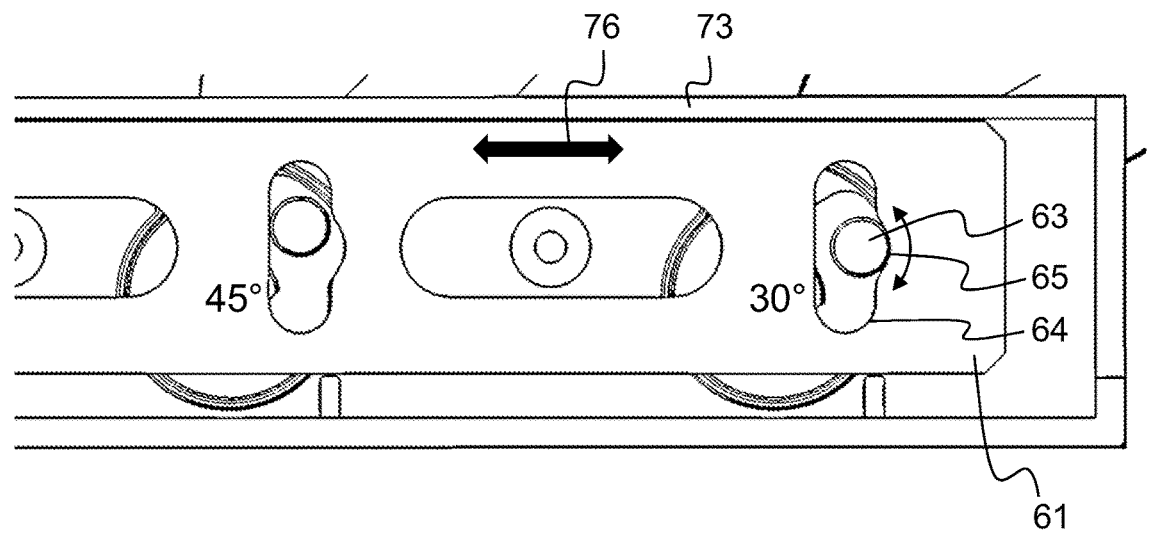
FIG. 22
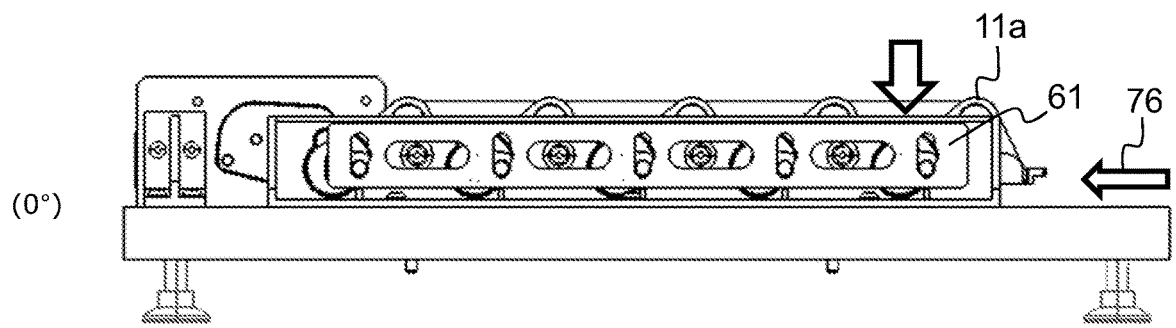
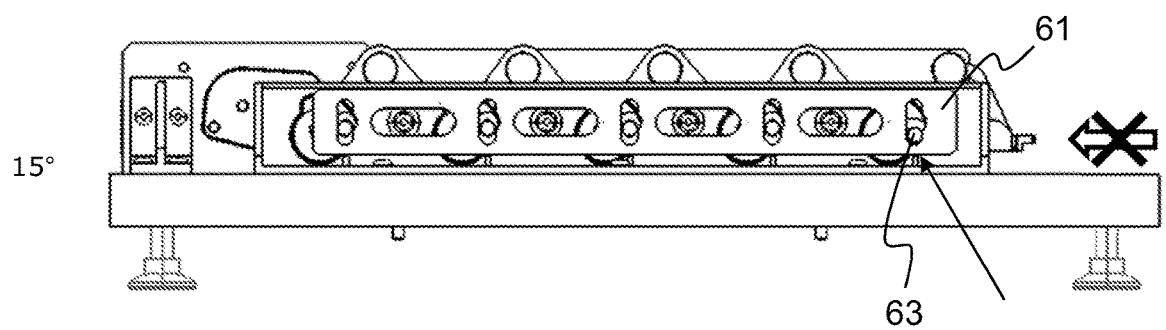
FIG. 23

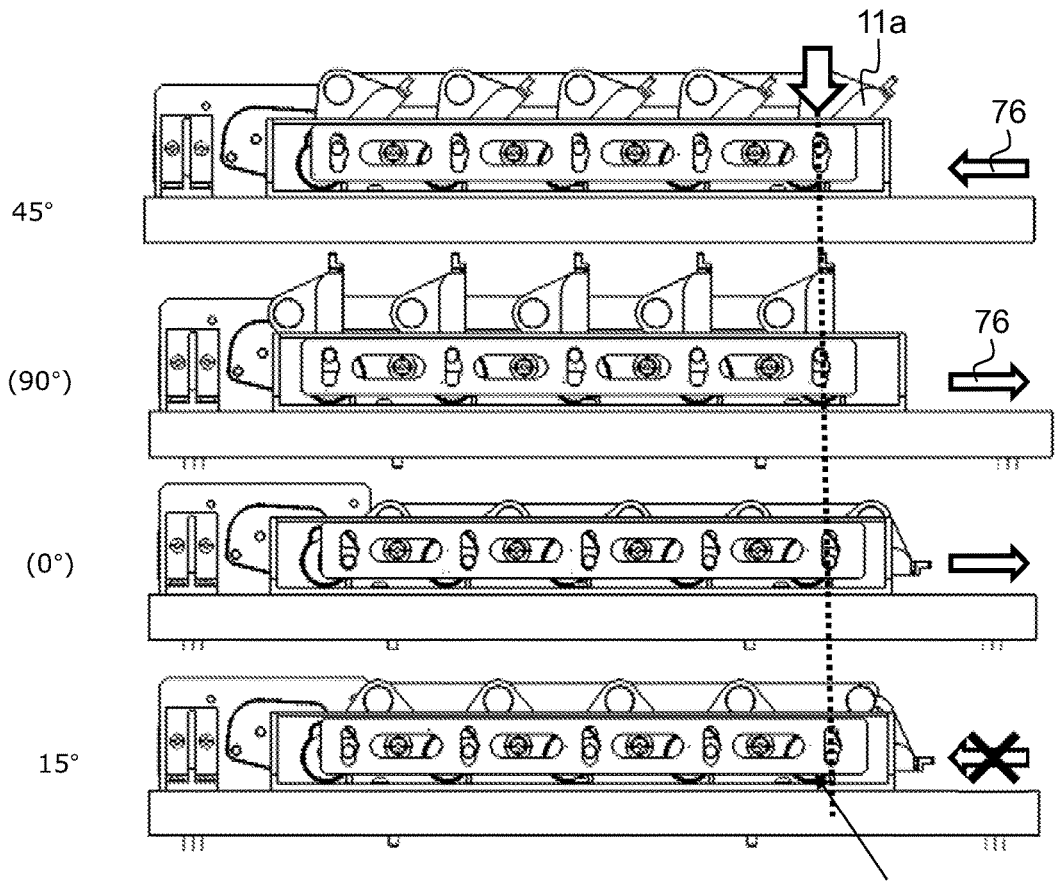
FIG. 26
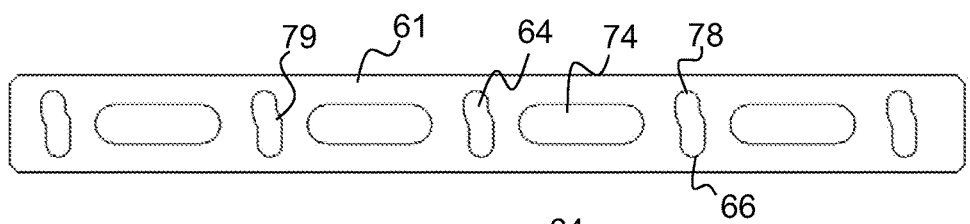
FIG. 27 a)
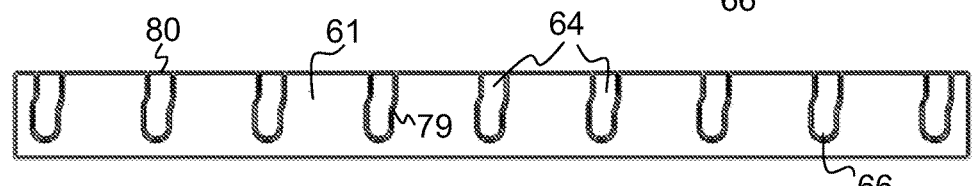
FIG. 27 b)
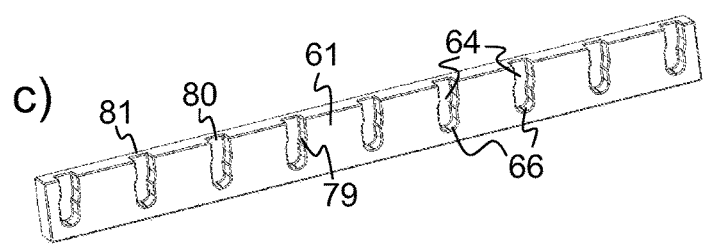
c)

RADIATOR SHUTTER FOR MOTOR VEHICLES

CROSS REFERENCE TO RELATED APPLICATIONS

This application is a National Stage of International Application No. PCT/EP2020/082706 filed on Nov. 19, 2020, claiming priority based on Swiss Patent Application No. 01497/19 filed on Nov. 26, 2019, European Patent Application No. 19 214 688.4 filed on Dec. 10, 2019, and Swiss Patent Application No. 00397/20 filed on Apr. 2, 2020.

TECHNICAL FIELD

The present invention relates to a radiator shutter for motor vehicles, made of a thermoplastic material. Furthermore, the present invention relates to methods for producing such a radiator shutter and uses of such a construction.

PRIOR ART

A radiator shutter for motor vehicles is a device for the controlled guidance of the outside air flowing into the vehicle via the front to the engine. Reliable control of this air stream is critical for reliable management of the combustion process, i.e. for the efficiency of the engine and the pollutant emission.

A radiator shutter is generally a group of slats arranged horizontally or vertically in parallel, which are rotatably or pivotably mounted in a frame such that they are rotatable from a fully open position (the planes of the leaves of the horizontal slats oriented transversely to the vehicle axis are then arranged substantially in a horizontal plane) by an angle of somewhat less than 90° into a closed position, in which the slats then extend with their plane approximately vertically and each overlap in the edge region.

The slats mounted in such frame constructions are currently controlled by a small electric motor into the corresponding desired angular position that is predefined via a controller, so that the optimal supply of air is present for each operating condition.

SUMMARY OF THE INVENTION

It is the object of the present invention, amongst other things, to provide a radiator shutter, in particular for motor vehicles, which can be operated reliably, can be produced simply and in particular is robust in relation to malfunctions or prevents the latter and/or reports them back as quickly as possible to the controller.

Accordingly, the invention relates to a radiator shutter, in particular for a motor vehicle, for the controlled ventilation of the engine, having a frame in which at least two slats are rotatably mounted in such a way.

These slats can be pivoted from a fully closed position (about 0°), in which the leaves of the slats are arranged substantially parallel to the plane of the frame and, in the area in which they adjoin one another, either partly overlap or rest tightly on one another, so that the frame opening is substantially closed for the flow of air, into an open position (about 90°, typically actually about)85°, in which the leaves of the slats are arranged substantially perpendicular to the plane of the frame, so that the frame opening is substantially opened to the maximum for the flow of air.

These slats are mounted in bearing points on two opposite sides of the frame. In addition, in or on the frame, preferably integrated into an appropriate frame area, a motor which drives a single slat is provided on a motor side of the frame. In addition, on the same motor side of the frame, a coupling element is provided which transmits the rotation of the driven slat synchronously to the further slats.

The design proposed is in particular preferably characterized in that a locking element is provided for each slat on the mounting side of the frame facing away from the motor side of the frame, in the area of the mounting of the slats provided there, which preferably fulfils the function that, if a single slat no longer rotates synchronously with the other slats (this includes the driven slat), the rotational movement is automatically locked by these locking elements on this mounting side facing away from the motor. This is noted by the motor since an increased torque then suddenly has to be produced as a result of the unusual stop not envisaged in the normal operating state.

On the mounting side of the frame facing away from the motor side of the frame, in the area of the mounting of the slats provided there, a locking element is therefore provided for each slat, wherein the locking elements are coupled directly or indirectly such that, if at least one of the locking elements does not rotate synchronously with all the other locking elements, the rotational movement of the locking elements is blocked in at least one direction, preferably in a force-fitting and/or form-fitting manner.

The locking elements can be formed as separate elements from the actual slats so that, if a slat breaks, the locking elements still remain in the frame and can ensure the locking function, for example with a locking rod or by means of interaction with the adjacent locking elements. Alternatively, it is possible to design the slats to be connected or even formed in one piece with the actual slats; then it is preferably ensured that even if a slat breaks the locking elements remain in the frame. For this purpose, for example, the connection between locking elements and slats (in the form, for example, of a connecting pin) can be formed as a detachable plug-in connection or as an intended fracture point, so that in each case the locking element remains in the frame if the slat breaks. In order to assist this, the locking element can at least partly be caught in the frame or in an additional covering of the frame (for example by a corresponding contour in a covering) such that the locking element cannot come out of the frame or this covering at all in the event of breakage of the slat.

Preferably, a locking disk is provided, and the locking disks have a form which, if at least one of the locking disks does not rotate synchronously with all the other locking disks, blocks the rotational movement of the locking disks, in particular in a force-fitting and/or form-fitting manner.

According to a first preferred embodiment, the design is characterized in that at least three, preferably at least four, in particular preferably exactly four, slats are mounted in parallel in the frame.

A further preferred embodiment is characterized in that the respective locking disk is coupled with the associated slat in both directions of rotation, and wherein the locking disks preferably each have at least one locking plate arranged substantially perpendicular to the respective slat axis.

A further preferred embodiment is characterized in that at least a first locking plate has a larger radius in a first circumferential area than in a second, preferably substantially opposite, circumferential area.

A further preferred embodiment is characterized in that there are two, preferably adjacent, locking plates offset in relation to the shaft of the locking disk, wherein in particular a second locking plate preferably has lateral projections at the side.

A further preferred embodiment is characterized in that at least one locking disk, preferably all of the locking disks, are designed to be mirror-symmetrical with respect to a mirror plane which encloses the shaft.

A further preferred embodiment is characterized in that in the non-locked operating state, a minimum spacing between the locking disks is always maintained, wherein this minimum spacing preferably lies in the range from 0.1-5 mm or 0.1-4 mm, preferably 0.1-1 mm, in particular in the range from 0.25-0.75 mm.

A further preferred embodiment is characterized in that the locking elements have at least one engagement pin offset radially with respect to the axis of rotation of the slats, which extends parallel to the axis of rotation of the slats and, during rotation of the slat, completes an arcuate movement synchronously with the latter, and in that the engagement pins of all the locking elements are coupled via a common locking rod extending perpendicular to the axis of the slats.

The engagement pins preferably run in locking recesses in the locking rod, wherein the locking recesses are preferably configured as a slot or elongated recess, of which the longer axis extends perpendicular to the main direction of extension of the locking rod. The slot or elongated recess can be configured as a passage opening or as a groove, in particular in the form of a slotted guide. It is also possible that the slot or elongated recess is not closed on at least one side for easy mounting in the locking rod, and this open side is subsequently closed by a further component for operation. Especially with this open design, it is advantageous if the slot or elongated recess is not designed in the form of a passage opening but in the form of a groove. The locking rod can further preferably be mounted in such a way that it can be displaced substantially only along its main direction of extension but not in a direction perpendicular thereto. For this purpose, corresponding guide grooves, arranged along the main direction of extension of the locking rod, or corresponding passage openings, in which stationary guide pins engage, can be arranged.

The engagement pins are preferably deflected substantially to the maximum extent in the fully closed position or in the fully open position in the main direction of extension of the locking rod with respect to the axis of rotation of the respective slat and, during the rotation into the fully open or the fully closed position, rotate into a position in which they are located in the main direction of extension of the locking rod, substantially at the height of the axis of rotation of the respective slat, wherein, in the fully open or fully closed position, the engagement pins preferably each come to lie in the end region of the slot or the elongated recess.

The slot or the elongated recess preferably each has a catch depression and/or a lateral offset in the direction of the maximum deflection of the engagement pins, preferably halfway up the slot or the elongated recess.

The locking rod can be guided in a locking guide in such a way that it can be displaced only in a single direction perpendicular to the axes of rotation of the slats but not in the direction of the normal to the plane which is covered by the axes of rotation of the slats.

A further preferred embodiment is characterized in that the locking disks are formed as components separate from the slats, into which preferably bearing pins of the slats are inserted only so as to be secured against rotation.

A further preferred embodiment is characterized in that the locking disks are arranged in an encapsulated area of the frame which is separated by a partition wall from the passage opening of the frame, and wherein, preferably, bearing pins of the slats engage through passage openings in the partition wall. The mounting projections of the locking disks can in turn engage in the passage opening in the partition wall, and these mounting projections can be configured with a blind hole or a passage opening, so that a corresponding bearing pin of the respective slat engages in this hole. There is preferably structuring of the interior of this opening and corresponding structuring of the outer contour of the mounting pin of the respective slat, so that the slats are inserted so as to be secured against rotation. In addition, on the outer side of such mounting projections, sliding webs extending axially, which reduce the susceptibility to contamination, can be arranged, since these sliding webs slide only in regions in the corresponding receiving openings in the frame or a corresponding partition wall.

A further preferred embodiment is characterized in that the slats have a length of at least 10 cm or at least 20 cm or at least 50 cm, preferably of more than 60 cm or more than 1 m, in particular preferably in the range from 10-150 cm or 20-120 cm or else in the range from 1.2-2 m, and wherein, in particular, a vertical intermediate web which supports intermediate mounting regions of the slats is preferably provided in the frame.

The construction can also be a radiator shutter having more than one slat area, for example two slat areas on both sides. The slat areas can each be driven individually by a motor or they can also preferably both be driven by the same motor. In the latter situation, this motor is preferably arranged in the middle between the two slat areas, and the locking mechanism is in each case individual on the outside for each slat package. If a central motor is used, in this situation it is possible to choose as a coupling rod a rod which moves both slat packages in one piece or at least firmly joined together.

In particular if individual slats have a torsional stability that is inadequate for feedback to the motor, one of the slats in a slat package can be formed selectively with a higher torsional stability than that of the other slats, or a separate transmission element with adequate torsional stability can be provided instead of a slat or in addition to a slat (for example arranged in the frame above or below the slat package), in order to ensure sufficient feedback to the motor in the event of blockage or failure of a slat.

A further preferred embodiment is characterized in that the slats have a production-related cavity in the interior extending along the axis of the respective slat.

A further preferred embodiment is characterized in that the coupling element is formed as a coupling rod, wherein the motor preferably drives the driven slats directly via their axle, and the coupling rod, which is preferably arranged parallel to the plane of the frame and perpendicular to the axes of the slats, is moved via a coupling lever, and the other slats are moved synchronously via corresponding coupling levers coupled to the coupling rod.

In addition, the present invention relates to a method for operating or controlling a radiator shutter as described above, wherein this method is preferably characterized in that the controller of the motor is designed such that an error message is output if the motor moves to a locked stop position because of locking of the locking disks, which does not correspond to the closed or the opened end position of the slats, wherein the fact that such a locked stop position has been reached is detected via an increase in the torque generated by the motor.

Furthermore, the present invention relates to a method for producing a radiator shutter as described above, which is preferably characterized in that the frame, slats and locking disks are produced individually from a thermoplastic material, preferably from a glass fiber-reinforced thermoplastic material, in particular preferably from glass fiber-reinforced thermoplastic polyamide in an injection molding process, and are then assembled to form the radiator shutter.

Last but not least, the present invention relates to the use of a radiator shutter as described above as an air inlet control element in a motor vehicle or in general in a transport means, in particular in a motor vehicle, preferably for specific air supply to an engine (internal combustion engine, electric motor), an engine component, an energy store (for example a battery in an electrically operated vehicle) or another heat-generating component.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 5 shows a further radiator shutter with locking elements;

FIGS. 6 a) and 6 b) show the radiator shutter according to FIG. 5 in a) an enlarged detail of the motor side and in b) an enlarged detail on the mounting side of the slats with the locking elements;

FIGS. 15 a) to 15 e) show the various positions when a locking element does not co-rotate (the lowest) and, starting from the half open position (42.5°), is to be closed, in each case from the side of the second locking plate, wherein in a) the half open starting position (42.5°) is shown, in b) the closed position (0°), wherein the lowest locking element remains stationary, in c) the backward rotation to the open position at around 45° if the lowest locking element is pushed out of its rotational position is shown, in d) the open position (85°), and in e) the blocked position at about 40° after being rotated back in the direction of the closed position;

FIGS. 16 a) to 16 d) show the various positions when a locking element does not co-rotate (the lowest) and, starting from the half open position (42.5°), is to be opened, in each case from the side of the first locking plate, wherein in a) the half open starting position (42.5°) is shown, in b) the position at around 45° if the lowest locking element is pushed out of its rotational position, in c) the open position is shown, in which the first locking plates come into contact but do not lock, and in d) the blocked position at around 40° after being rotated back in the direction of the open position;

FIG. 18 shows a further exemplary embodiment of a radiator shutter in a perspective illustration from the side of the engine, this time with five slats, which radiator shutter is typically provided for a vertical alignment of its axes;

FIG. 22 shows the locking when the engagement pin of the broken slat is caught in the catch depression;

FIG. 23 shows the locking when the slat on the far right is broken and the completely closed position is assumed;

FIG. 26 shows the locking when the slat on the far right is broken and a move is made from the half open position (42.5°) in the open direction;

FIGS. 27 a) and 27 b) show alternative designs of the locking rods, wherein in a) a lateral view of a first embodiment is shown, in which the locking recesses are configured as passage openings with an offset, in b) a second embodiment is shown in a lateral view, in which the locking recesses are formed as grooves open on one side with an offset, and in c) a perspective view of the second embodiment is shown;

DESCRIPTION OF PREFERRED EMBODIMENTS

Figure 1:
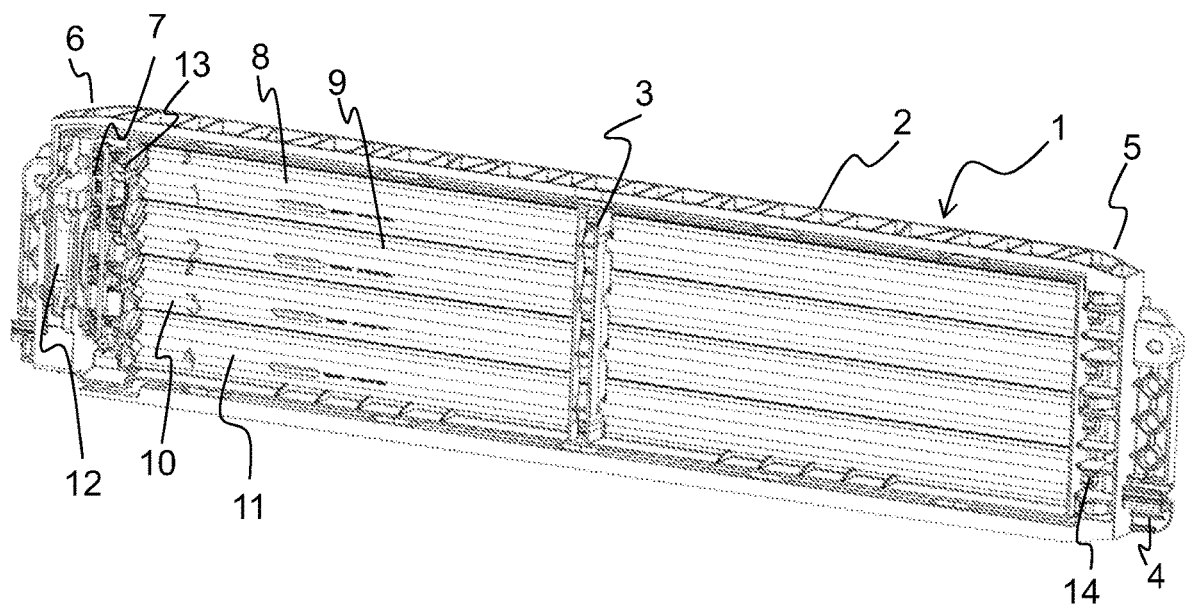
FIG. 1 shows a radiator shutter in the assembled state in a perspective view.

FIG. 1 shows a radiator shutter 1 having a frame 2. The frame has two horizontally opposite long sides and two vertically opposite frame sections. The vertical frame section shown on the right here has a lateral fastening area 4 and the mounting area 5 for the horizontally extending slats is provided in this frame section shown on the right-hand side. In FIG. 1, such a radiator shutter mounted in a motor vehicle is illustrated from the motor side. Before the mounting in a vehicle, an internal covering is additionally attached which, here and in the following illustrations, is not reproduced in order to have the inner workings of the frame visible.

Figure 2:
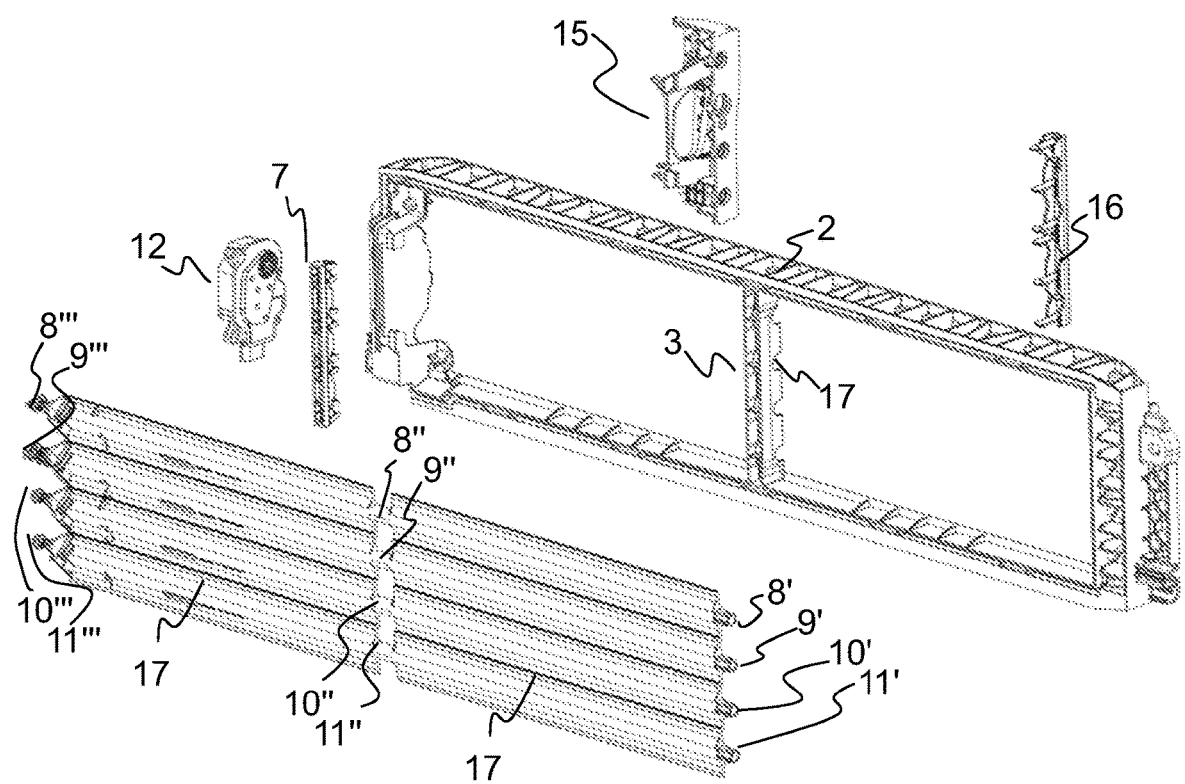
FIG. 2 shows a radiator shutter according to FIG. 1 in an exploded illustration.

The slats 8-11 extend horizontally over a great length of more than 1 m. They are mounted and driven on the vertical frame side illustrated on the left here, the motor area. They are likewise mounted on the other side, the mounting area 5 of the frame. Because the slats 8-11 have a great length, there is a vertical intermediate web 3 in the frame, in which the slats are likewise mounted. For this purpose, as can be seen from the exploded illustration according to FIG. 2, the slats each have an intermediate mounting 8"-11"; there the slat is respectively formed cylindrically and does not have the actual slat leaves 17 extending on both sides of the central axis of the slat. On the motor side 6, the frame has an appropriate recess, so that the motor 12, which is firstly inserted into a motor holder 15, which is an injection molded component, can be inserted. The motor drives the second slat, having the reference sign 9, directly from above in that the motor shaft is coupled directly or indirectly to the bearing head 9'''. On the motor side, the slats are mounted via such bearing heads 8'''-11''' and, on the opposite side, via bearing pins 8'-11'.

For the mounting, firstly the slats are inserted with their bearing pins 8'-11' into corresponding mounting recesses in the mounting area 5 and into corresponding bearing points in the motor holder 15. For this purpose, the motor 12 is preferably previously inserted into the holder 15 and then inserted into the frame together with the slat package until the intermediate bearings 8"-11" engage in the corresponding recesses 17 in the vertical intermediate web 3. Then, the intermediate mounting can be closed from the front side with a covering 16.

As already mentioned above, the motor 12 is coupled to the bearing head 9" of the driven slat 9. The motor moves the slats between a fully closed position (0°), in which the lateral ends of the slats just overlap somewhat, and a fully open position (about)90°), in which the planes of the slats are substantially perpendicular to the plane of the frame, and the passage for air is maximally opened. The closed position is illustrated in FIG. 1.

In order to couple the movement of the other slats 8, 10-11 synchronously to the movement of the driven slat 9, a coupling rod 7 is provided. The coupling rod is driven via an eccentric on the drive slat 9 and moves the other slats 8, 10-11, which in turn have analogous eccentrics, synchronously.

Figure 3:
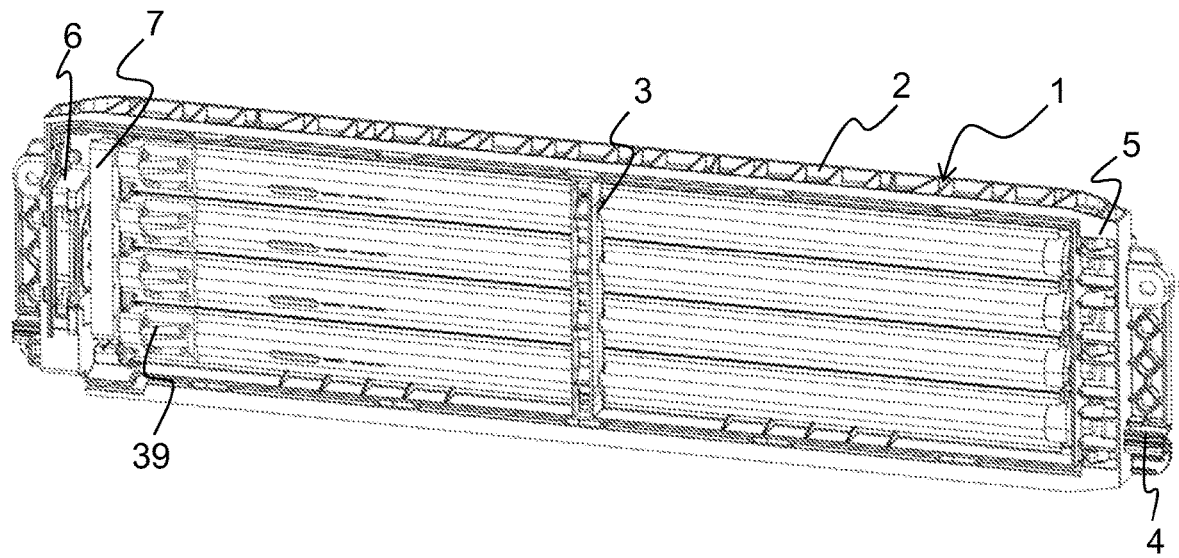
FIG. 3 shows a radiator shutter with locking elements.
Figure 4:
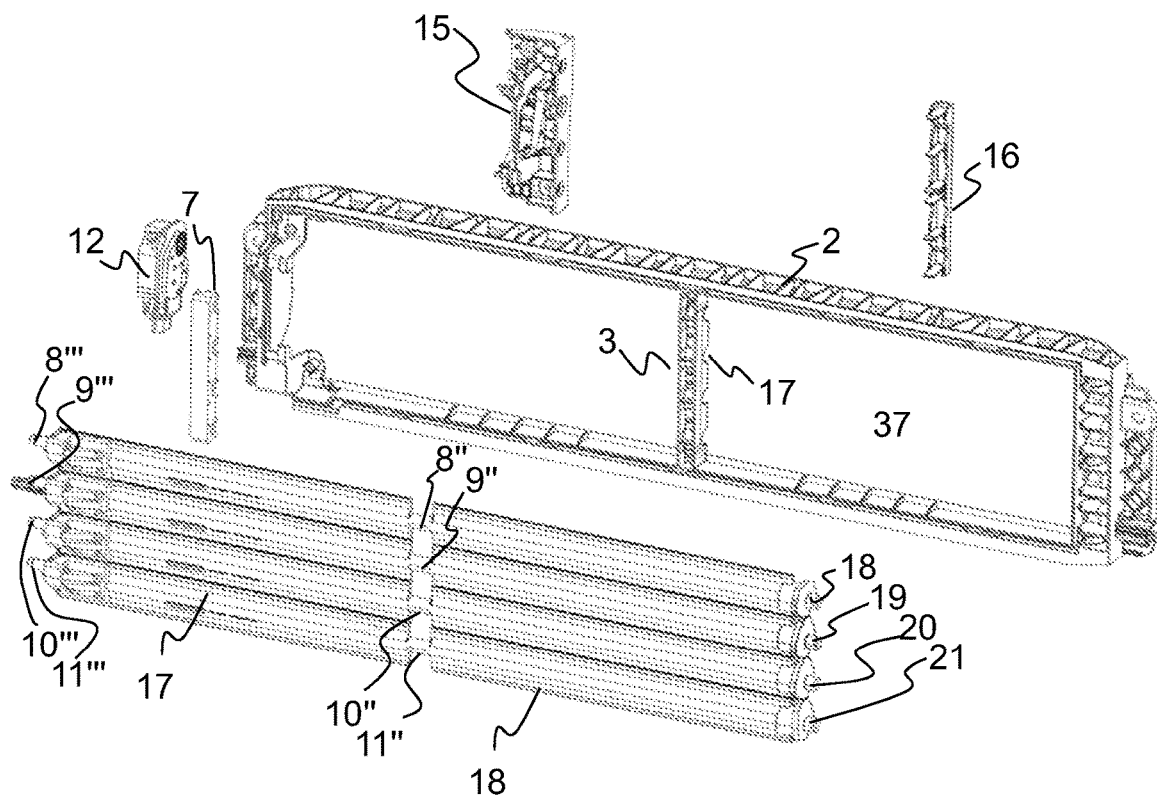
FIG. 4 shows the radiator shutter from FIG. 3 in an exploded illustration.

A radiator shutter with locking elements is illustrated in FIG. 3. A corresponding exploded illustration is reproduced in FIG. 4. Analogous or identical elements which have already been described in conjunction with FIGS. 1-2 will not be described again in the following.

In the mounting area 5 there are now OBD disks 18-21 (OBD stands for on-board diagnosis) plugged onto the ends of the slats there. The function of these disks will be explained further below in detail. Therefore, the ends of the slats illustrated on the right-hand side and facing away from the motor are no longer mounted directly in the frame but in these OBD disks 18-21, which are used as locking elements mentioned at the beginning. All of these disks 18-21 are preferably identically dimensioned and, exactly like the frame and the slats, are produced in an injection molding process from a thermoplastic material, preferably polyamide 6 with a glass fiber content of about 50%.

In order to be able to pick up the torque increased by the locking in the event of a defect on the side facing away from the motor, here the areas of the slats that face the motor are provided with reinforcements 39; the reinforcements are formed as separate components here which are screwed on but, preferably, can be produced in one piece at the same time as the slats in the injection molding process. The locking elements, i.e. the disks 18-21, are, however, formed as separate elements from the slats 8-11. This is important since, should a slat break entirely, the associated OBD disk would possibly also break as well and would then no longer to be able to detect its locking function in the event of a defect. Here, the coupling rod is likewise formed to be stronger than in the illustration according to FIG. 1, once more because of the higher torques which can be present in the event of a defect because of the locking.

Figure 7:
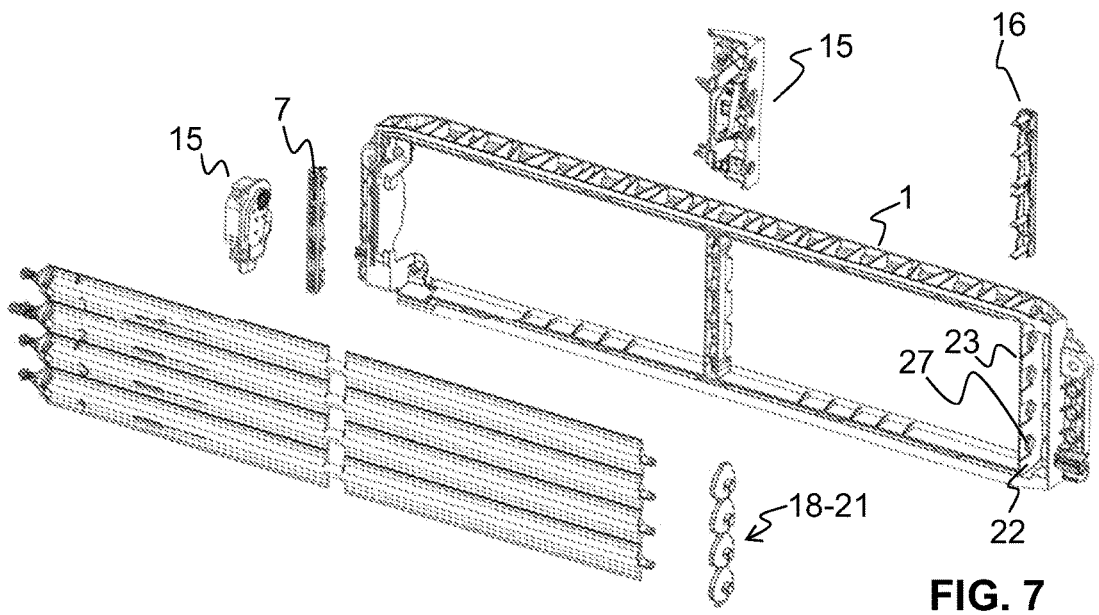
FIG. 7 shows the radiator shutter according to FIG. 5 in an exploded illustration.

A further somewhat different design of such a radiator shutter with locking elements is illustrated in FIG. 5. A corresponding exploded illustration is reproduced in FIG. 7. In this exemplary embodiment, as can be seen in particular with reference to FIGS. 6 a) and b), there are no reinforcements 39 in the form of separate screwed-on components on the motor side. Here, the respective eccentrics are designed more strongly in the form of coupling levers 25 of the respective slats. The coupling levers 25 each have a coupling pin 26 facing the coupling rod 7. These coupling pins 26 each engage in corresponding coupling grooves in the coupling rod 7. Here, too, the motor 12 drives the corresponding bearing head 9''' of the driven slat 9 directly. Movement coupling with the other slats is correspondingly carried out via the coupling lever 25 of the slat 9 to the coupling rod 7 and then from the latter to the other slats via the corresponding coupling levers 25 of the latter.

FIG. 6 b) illustrates how the locking elements 18-21 are arranged in an encapsulated space 22 for protection against dirt and the like. Thus, no water, dirt, etc. is able to act on these locking elements, which are important for the diagnosis; the encapsulated area 22 is closed toward the front and toward the rear is likewise further closed during the final assembly by a frame covering, which is not shown here. The encapsulated area 22 for the locking elements is therefore substantially separated completely by a partition wall 23 from the frame opening 37, through which the air and also dirt and water, etc., can flow.

Figure 8:
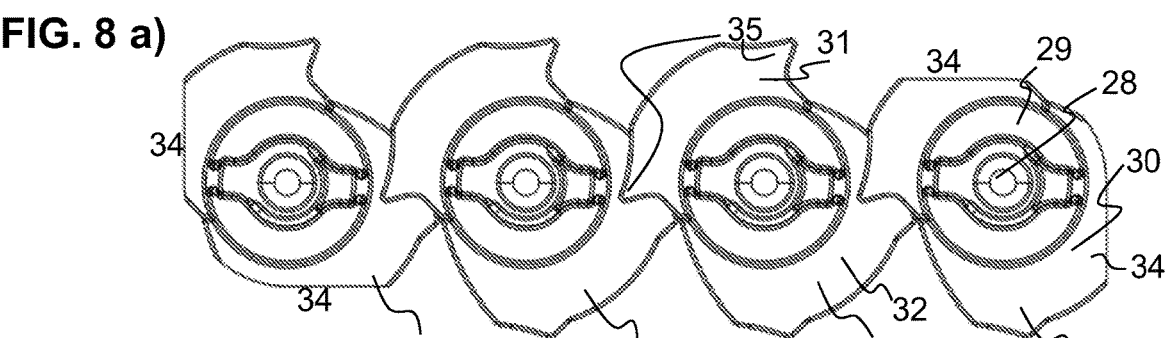
FIGS. 8 a) to 8 c) show the locking elements in a) a view from the frame interior, in b) a view from the frame exterior and in c) a perspective view.
Figure 8:
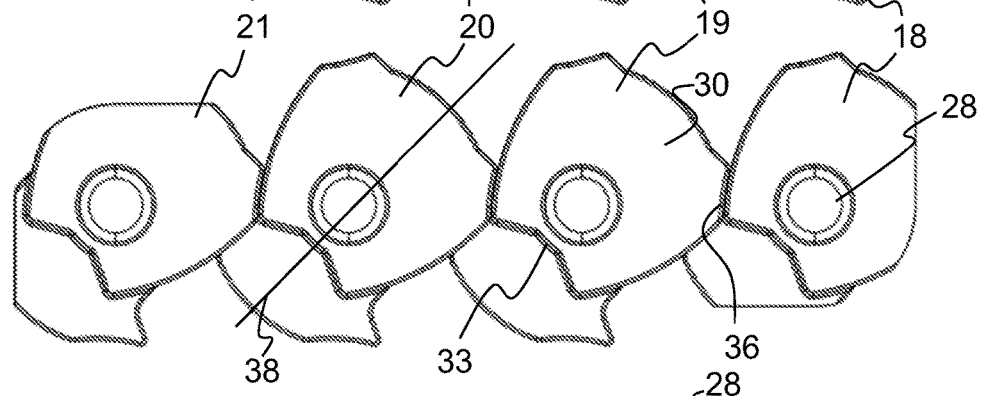
Figure 8:
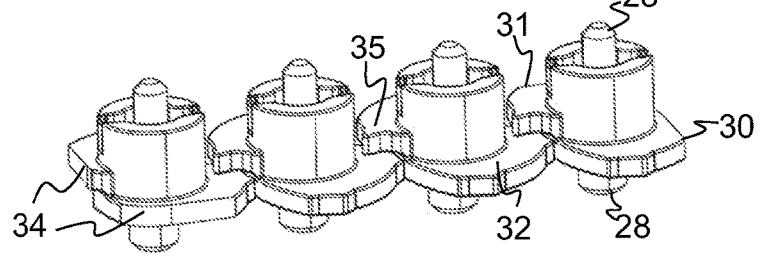

The function and form of the locking elements 18-21 can be explained best with reference to FIGS. 8 a) to 8c). Here, at the top, the series of locking elements 18-21 is shown from the side of the frame opening and in b) the quasi folded view from outside. In FIG. 8 c), a perspective view of this series of locking elements is illustrated. All the locking elements are in principle preferably configured identically; here the locking elements 18 and 21 arranged entirely on the outside are modified slightly (compare the capped areas 34), since the housing provided in the frame would otherwise have led to collisions in certain rotational positions. Preferably, however, all the locking elements 18-21 are identical (cf. FIGS. 9ff).

Each locking element has two guide shafts 28 or guide pins projecting in both directions. The side facing the slat here is formed such that there is a guide collar 29 with incisions extending axially, in which the leaves 17 of the slats engage. Alternatively, however, it is possible to dispense with such a guide collar 29 and, on this side in the pin 28, to provide an axial hole or a recess directly for the respective bearing pin 8'-11' of the associated slat. This recess has an internal structure, so that the corresponding pin of the slat can be inserted into this recess so as to be secured against rotation.

The two shafts 28 projecting on both sides engage in corresponding bearing recesses, in the passage openings 27 on the side of the frame opening. The locking elements are therefore, so to speak, mounted individually and independently of the slats 8. This is important since, if a slat 8 breaks, the corresponding locking disk 18-21 must not likewise fall out of the frame, otherwise it would no longer perform the locking function and, correspondingly, the diagnostic function would no longer be provided.

The locking elements 18-21 are formed with corresponding locking plates 30, 31, which are formed as eccentrics and which extend at right angles to the shaft 28. The form of these locking plates is chosen such that only synchronous corotation is possible without any earlier or later locking collision of the locking plates. If one of the locking plates or one of the locking elements 18-21 does not co-rotate while the other locking elements rotate, a radial outer contour of a moving locking element comes into contact with an outer contour of the non-moved locking element in any case at the latest after an entire cycle (e.g. starting from open: closed and open again), irrespective of the starting position, which has the effect of quasi form-fitting locking. For this purpose, there is a first locking plate 30, which has a sweeping area 32 and, on the opposite side, a less sweeping area with an incision 33. These first locking plates are all at the same axial height in the adjacent locking elements. In order to ensure that, for all the starting positions in which one of the slats then fails, either immediately or at least after at the latest one or at the latest after two complete movement cycles, locking takes place, here there is additionally a second locking plate 31, which has lateral projections 35 at the sides. This second locking plate 31 can push the non-co-rotating adjacent locking plate into a changed rotational position in one cycle, so that in this changed rotational position, the first locking plate or else the second locking plate is then moved into a locked state.

Figure 9:
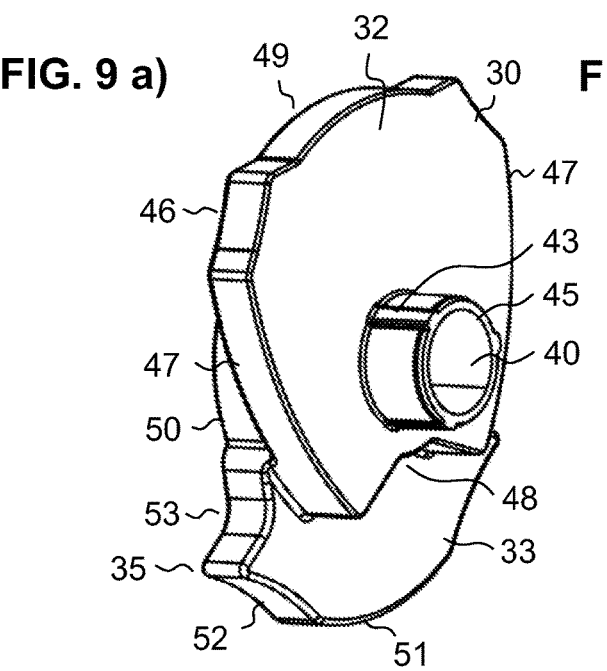
FIGS. 9 a) and 9 b) show locking elements according to a further embodiment in a perspective view, wherein a view of the first locking plate is shown in a) and a view of the second locking plate is shown in b)
Figure 9:
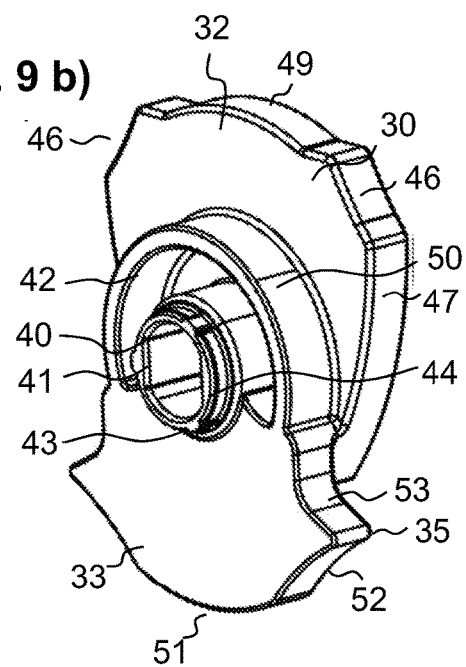

FIGS. 9 a) and 9 b) shows a perspective view of a locking disk 18-21 according to a further exemplary embodiment. The shape can be seen more exactly here. The locking disk has a passage opening in the form of an axial hole 40, in which there is a contour, here a planar flank 41, which is used to push a shaft element 8' of the slat inserted into this hole such that the locking disk is coupled to the corresponding slat with respect to rotation in both directions. Furthermore, there is a circumferential flange 44 on which sliding webs 43 are provided. The circumferential flange 45 runs in a corresponding recess in the frame, and the flange 44 arranged on the opposite side of the disk runs in the passage opening 27 in the partition wall 23. There is therefore a flange of this type not only on the side of the second locking plate 31 but also on the opposite side of the first locking plate 30; there, this flange 40 is designed to be higher than on the opposite side. The disks 18-21 are inserted into the encapsulated space 22 in that first of all the high flange 45 is inserted into the appropriate openings and then the disk is inserted with the aid of the mobility or flexibility of the partition wall 23 until the respectively opposite flange 54 is clipped into the respective passage opening 27. The sliding webs 43 lead to a lower susceptibility to dirt; dirt can in particular collect in the areas arranged between the sliding webs and formed with a lower radius, and therefore does not hamper the rotational movement.

The first locking plate 30, as mentioned above, has a sweeping area 32 on one side; the contour in this area is delimited by each of two blocking areas 46, which are connected via a transition area 49, and two lateral areas 47, in which the radius decreases gradually. These two lateral areas 47 are connected by an incision area 48 which, in conjunction with FIG. 8 a) to c), is specified by the reference sign 33.

On the next plane and directly adjacent to the first locking plate 30, there is the second locking plate 31. Here, there is a circumferential circularly cylindrical area 50 with a low radius, which is arranged in the sweeping area of the first locking plate 30. In order to save weight or to avoid distortion during production, a recess 42 can be provided here. On the side opposite this circularly cylindrical area 50 there is once more a sweeping area with the lateral projections 35 already mentioned above. In the sweeping area, these two projections 35 are connected via, in each case, firstly a concave transition region 52 and a convex blocking region 51 located in between. In relation to the circularly cylindrical area 50, the concave second transition region 53 follows the lateral projections 35. Both the first locking plate 30 and the second locking plate 31 contribute to the locking but the first locking plate 30 is used in particular also to move a disk not moving together with it in a cycle into a position such that locking can take place in the further movement sequence.

The locking function of the disks 18-21 can be explained with reference to FIGS. 10-17.

Figure 10:
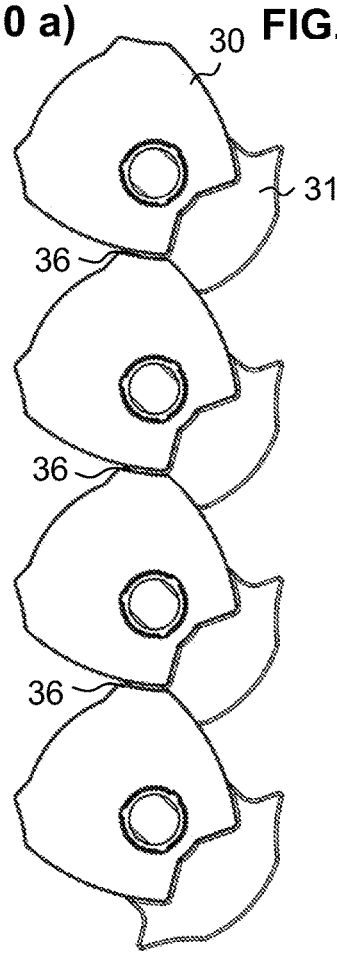
FIGS. 10 a) to 10 c) show the various standard positions from the side of the first locking plate, wherein the closed position (0°) is shown in a), the half open position) (42.5°) in b) and the open position (85°) in c)
Figure 10:
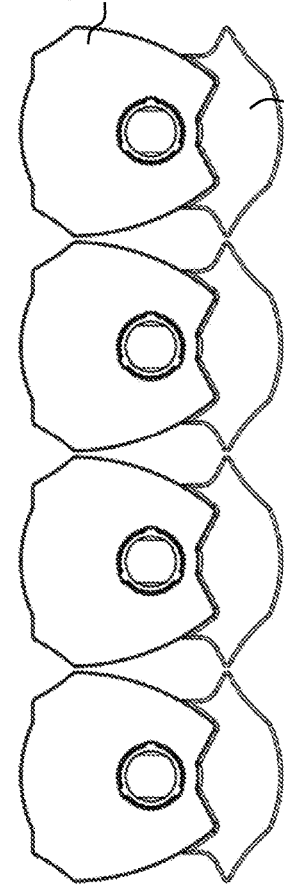
Figure 10:
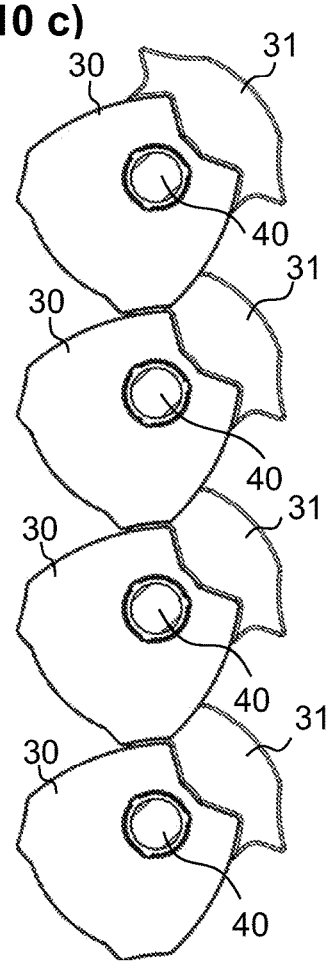
Figure 11:
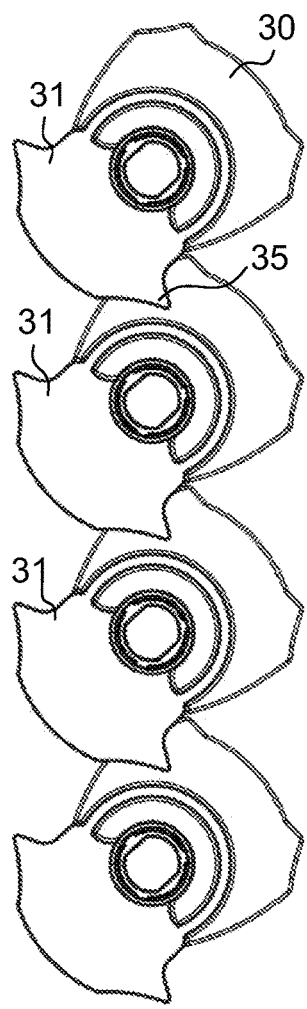
FIGS. 11 a) to 11 c) show the various standard positions from the side of the second locking plates, wherein the closed position (0°) is shown in a), the half open position (42.5°) in b) and the open position (85°) in c)
Figure 11:
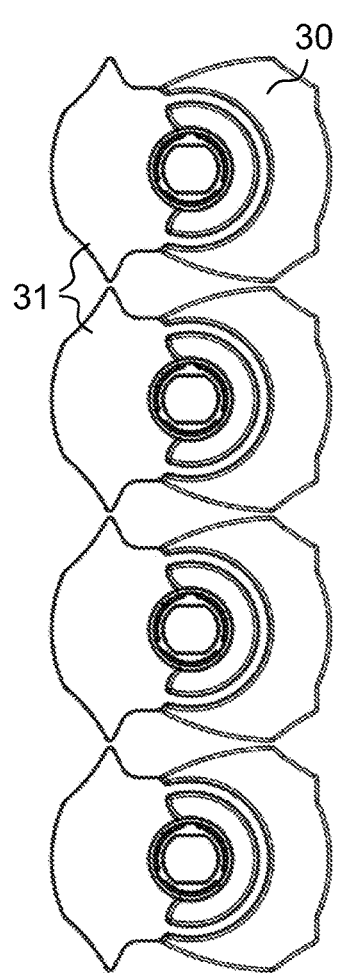
Figure 11:
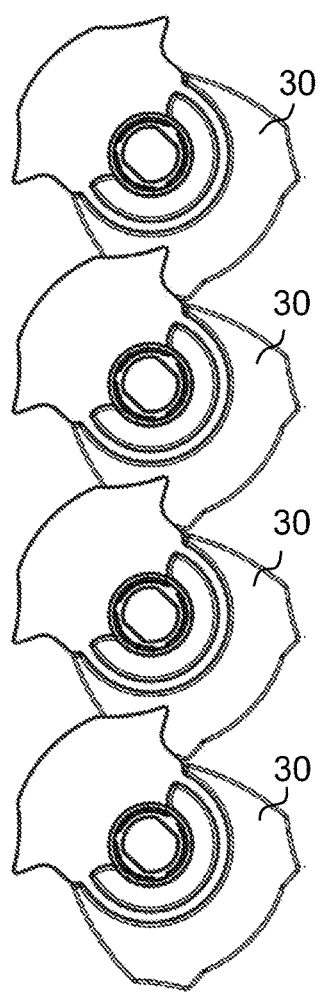

The starting point in each case is the normal position; this is illustrated in FIGS. 10 *a*) to 10 *c*) and 11 *a*) to 11 *c*) from the side of the first locking plate 30 and the second locking plate 31, respectively. The three normal positions are given by closed (0°), half open (42.2°), open (85°). In each of these positions, the disks do not touch one another. The minimum distance is respectively 0.1-5 mm or 3 mm or 0.5 mm.

Figure 12:
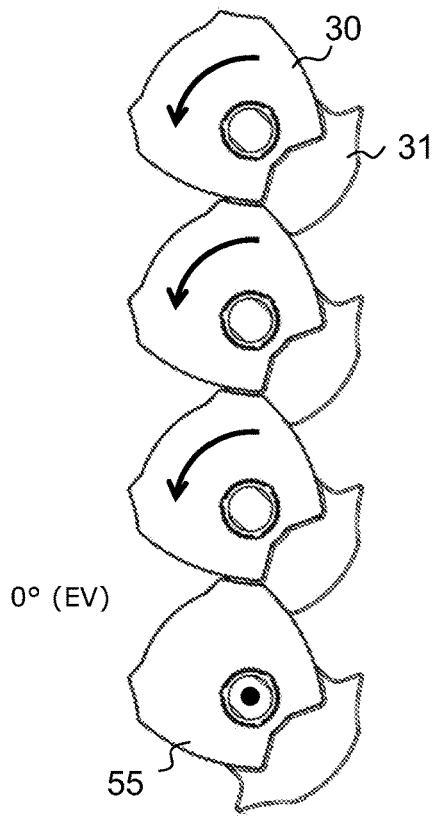
FIGS. 12 a) to 12 d) show the various positions when a locking element does not co-rotate (the lowest) and, starting from the closed position (0°), is to be opened, wherein in a) the open position (0°) is shown from the side of the first locking plate, and in b) the blocking at around 12° reached after the opening rotation is shown from the side of the first locking plate, and in c) the open position (0°) is shown from the side of the second locking plate and in d) the blocking at around 12° reached after the opening rotation is shown from the side of the second locking plate.
Figure 12:
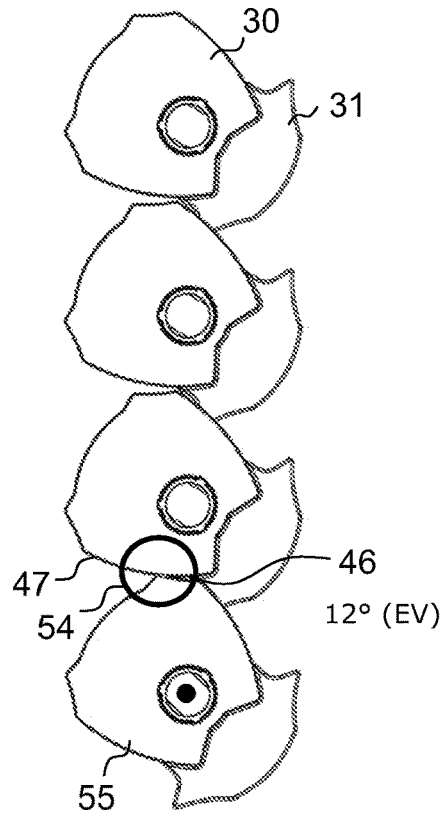
Figure 12:
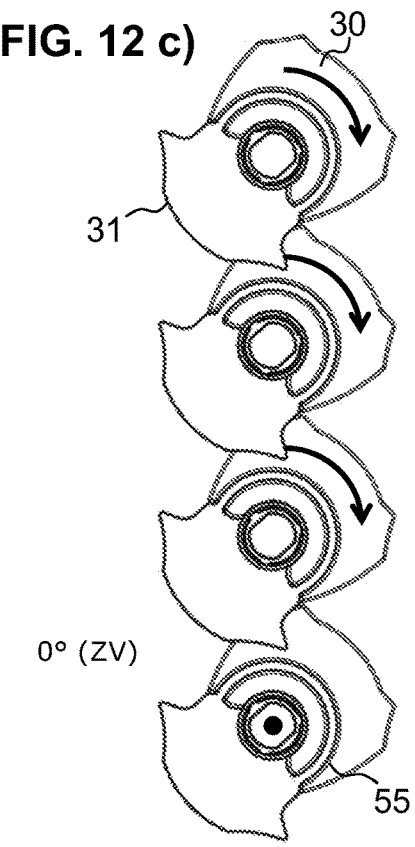
Figure 12:
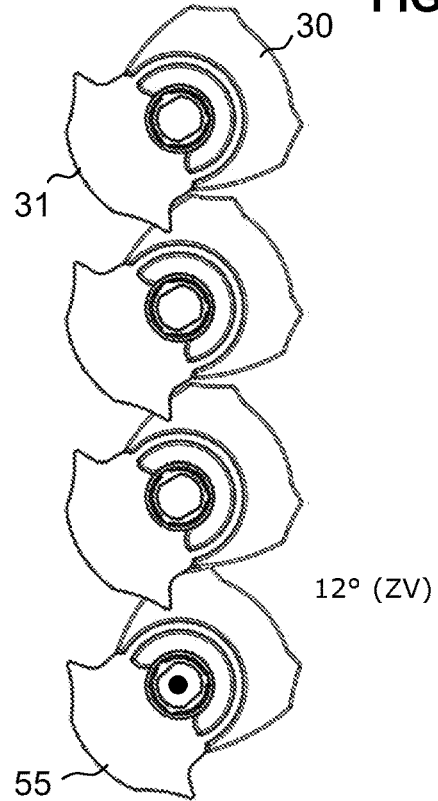

FIGS. 12 *a*) and 12 12 *d*) then show what happens when, starting from the closed position) (0°), the lowest slat is defective and the corresponding disk 55 does not co-rotate. As indicated in FIG. 12 *a*), the disks viewed here from the side of the first locking plate 30 begin to rotate in the counter-clockwise direction (see arrows) for the opening. At a position of about 12° (cf. FIG. 12 *b*), the lateral area 47 of the disk adjacent to the disk 55 already comes into blocking contact with the blocking area 46 of the failed disk 55.

The blocking therefore takes place, so to speak, immediately and after a rotation of only 12°. The same sequence of steps is shown in FIG. 12 *c* for the view from the side of the second locking plate 31, here the disks rotate correspondingly in the clockwise direction.

Figure 13:
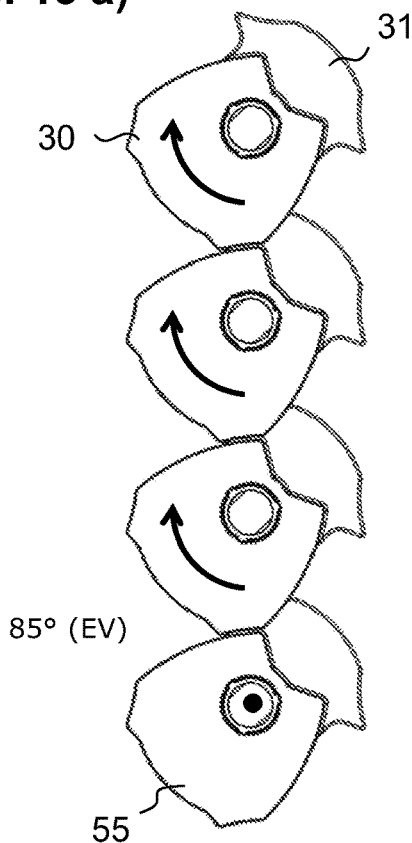
FIGS. 13 a) to 13 d) show the various positions when a locking element does not co-rotate (the lowest) and, starting from the open position (85°), is to be closed, wherein in a) the closed position (85°) is shown from the side of the first locking plate, and in b) the blocking at around 42° reached after the closing rotation is shown from the side of the first locking plate, and in c) the closed position (85°) is shown from the side of the second locking plates, and in d) the blocking at around 42° reached after the closing rotation is shown from the side of the second locking plate.
Figure 13:
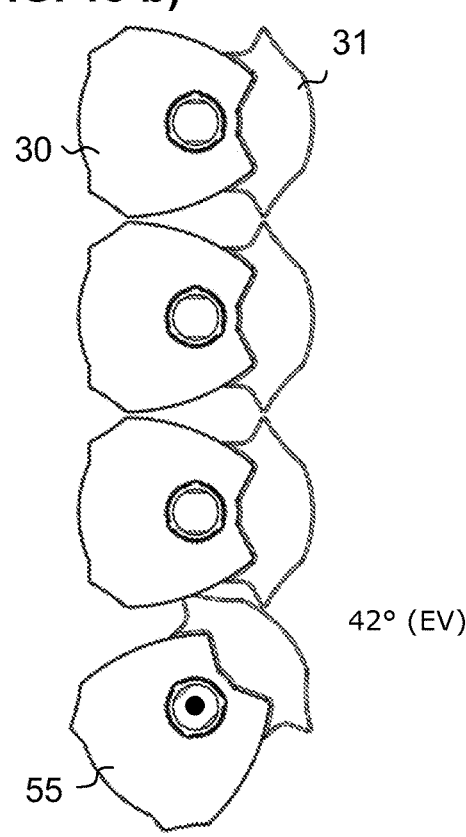
Figure 13:
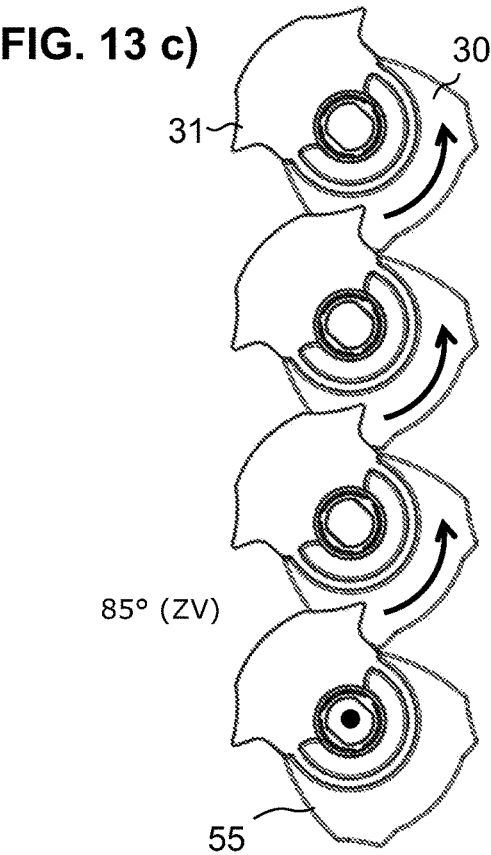
Figure 13:
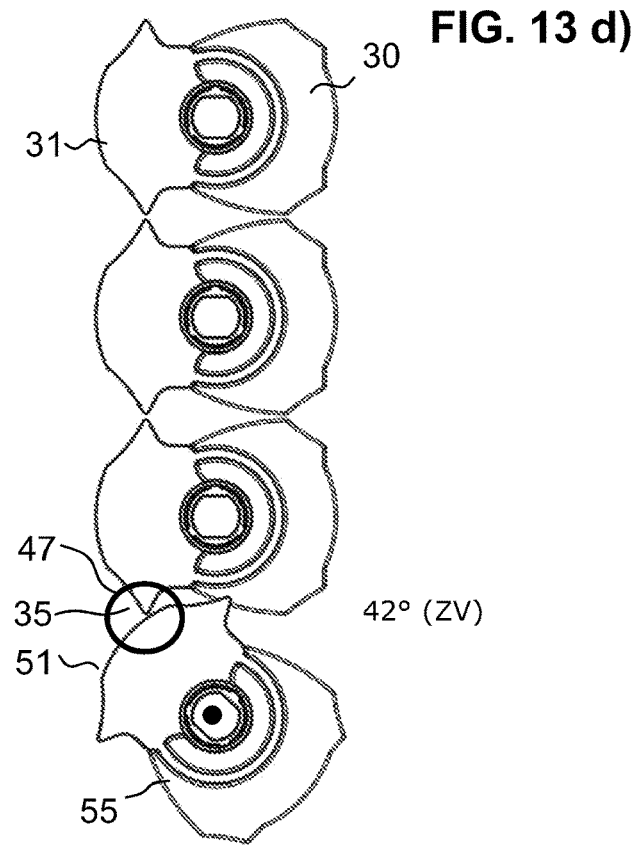

FIGS. 13 *a*) to 13 *d*) show what happens when, starting from the open position (85°), the disks are rotated in the direction of the closed position, once more in figures a) and b) from the side of the first locking plate and in figures c) and d) from the side of the second locking plate. Here, too, the lowest disk 55 is inactive. The blocking takes place here after the upper three disks have rotated by about 42°.

The blocking area 51 of the lowest disk and one of the lateral projections 35 of the second lowest disk then come into contact, and the three upper disks are thus blocked. Starting from the open position, it is therefore necessary for less than a quarter of a cycle to be run through in order already to run into a blocked situation. Here, too, a very fast diagnostic blockage therefore results.

Figure 14:
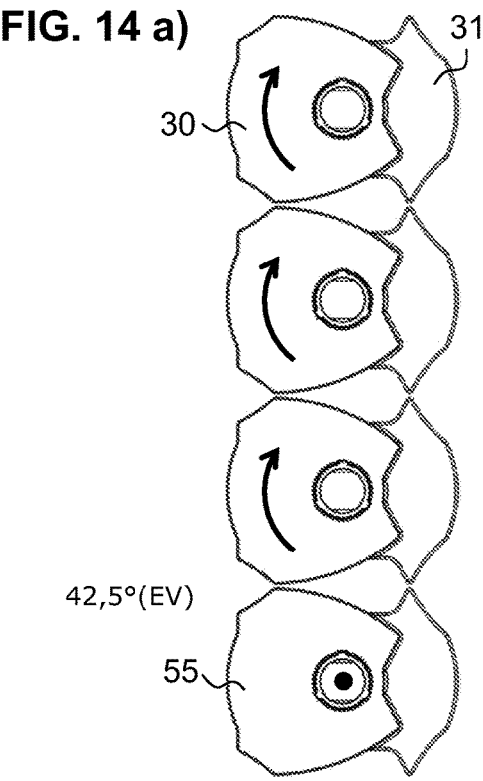
FIGS. 14 a) to 14 e) show the various positions when a locking element does not co-rotate (the lowest) and, starting from the half open position (42.5°), is to be closed, in each case from the side of the first locking plate, wherein in a) the half open starting position (42.5°) is shown, in b) the closed position (0°), wherein the lowest locking element remains stationary, in c) the backward rotation to the open position at around 45° if the lowest locking element is pushed out of its rotational position is shown, in d) the open position (85°), and in e) the blocked position at about 40° after being rotated back in the direction of the closed position.
Figure 14:
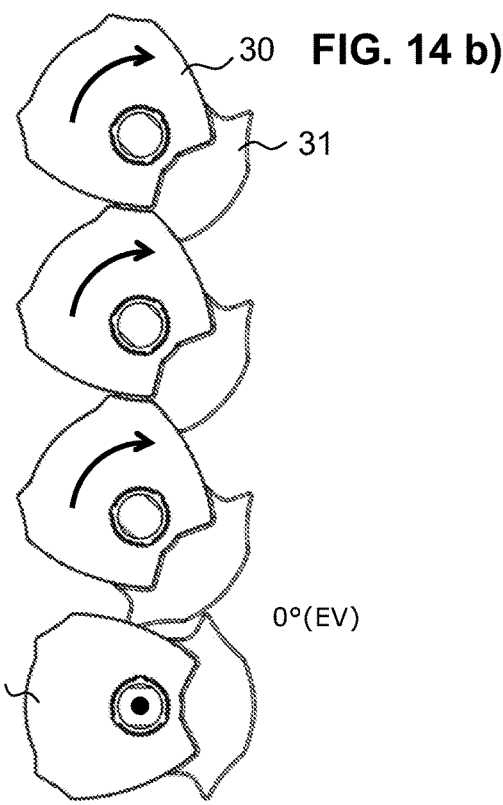
Figure 14:
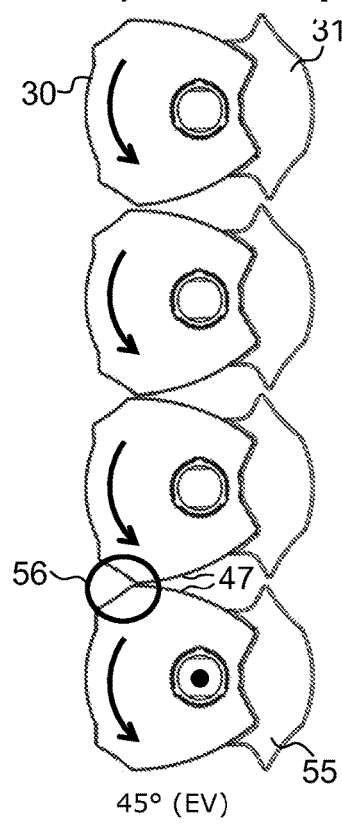
Figure 14:
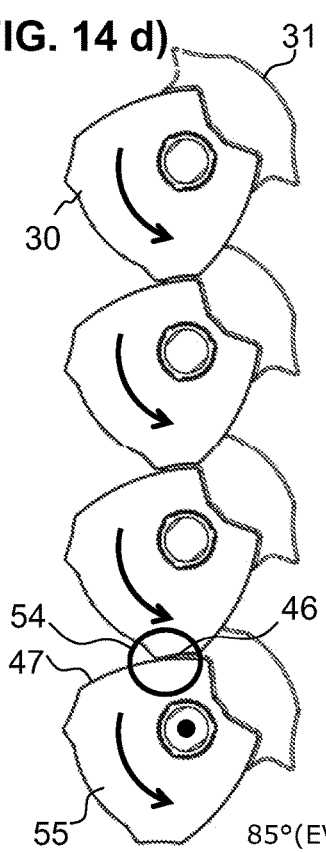
Figure 14:
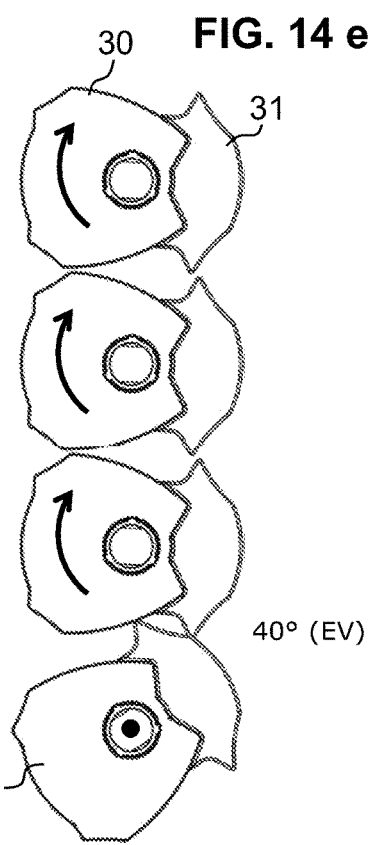
Figure 17:
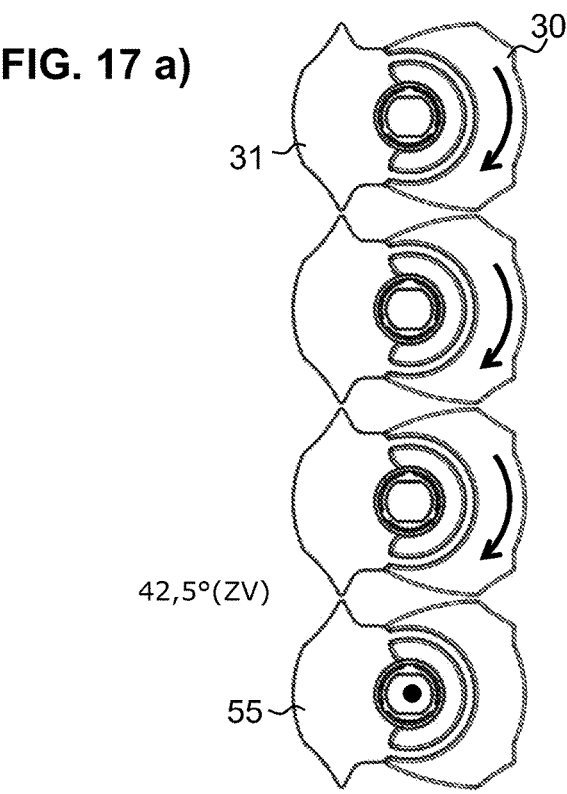
FIGS. 17 a) to 17 d) show the various positions when a locking element does not co-rotate (the lowest) and, starting from the half open position (42.5°), is to be opened, in each case from the side of the second locking plate, wherein in a) the half open starting position (42.5°) is shown, in b) the position at about 45° if the lowest locking element is pushed out of its rotational position, in c) the open position is shown, in which the first locking plates come into contact but do not lock, and in d) the blocked position at around 40° after being rotated back in the direction of the open position.
Figure 17:
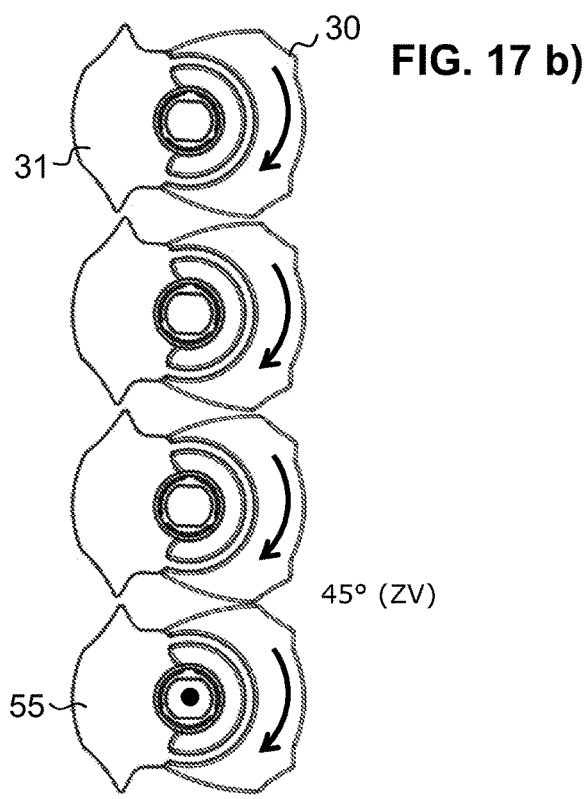
Figure 17:
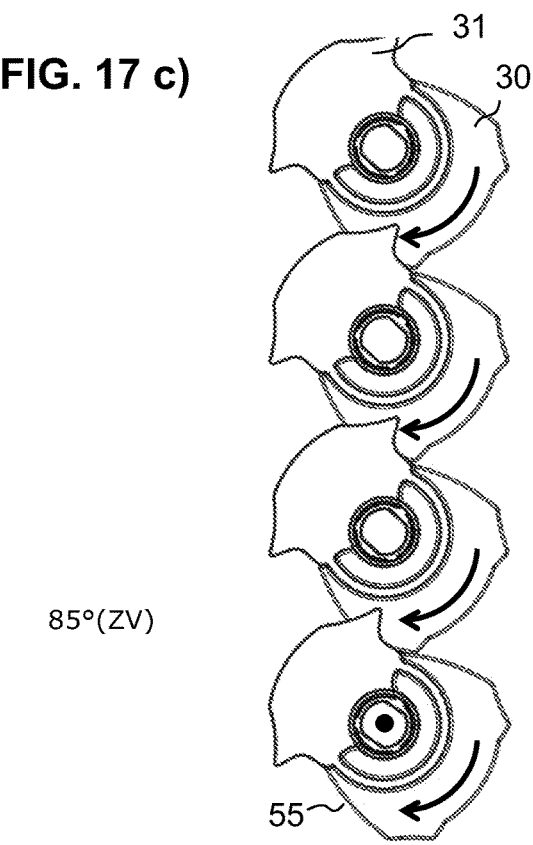
Figure 17:
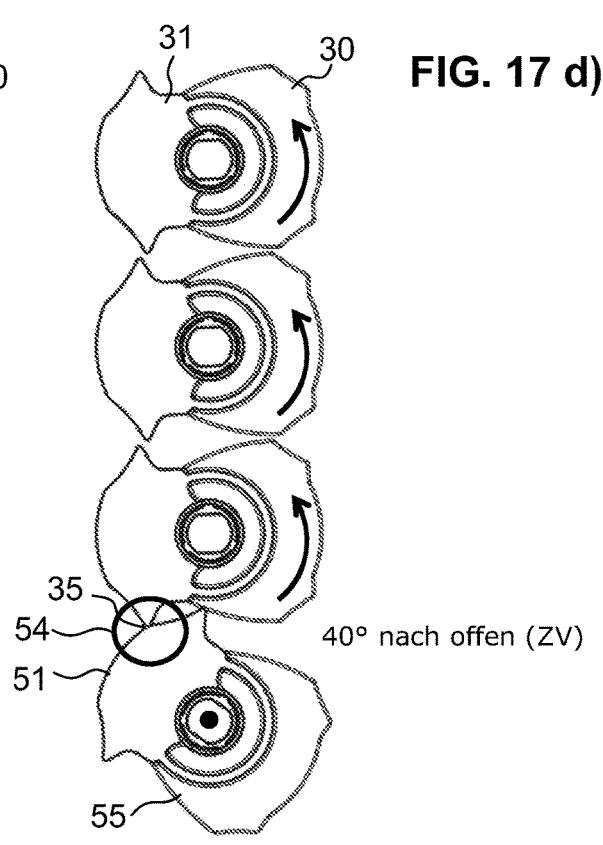

FIGS. 14 *a*) to 14 *e*) illustrate what happens when rotation takes place from the half open position (42.5°) into the closed position (0°), from the side of the first locking plate, and in FIGS. 15 *a*) to 15 *e*), the same from the side of the second locking plate. As can be seen at the transition from a) to b), firstly nothing happens until the closed position (0°) is reached. The lower disk simply does not co-rotate. If, then, the upper disks rotate back again (cf. figure c), then at about 45°, the lateral area 47 of the second lowest disk comes into contact with the corresponding lateral area 47 of the lowest disk and then rotates the lowest disk by pushing it into another rotational position when the open position is reached (cf. figure d).

If the three upper disks are then rotated in the direction of the closed position again, then the locking takes place at around 40° (cf. figure e) once more, since the lateral projection 35 of the second lowest disk blocks the blocking area 51 of the lowest disk 55.

Last but not least, FIGS. 16 *a*) to 16 *d*) and 17 *a*) to 17 *d*) show the behavior of the disks when, starting from the half open position (42.5°), rotation initially takes place into the closed position and the lowest disk 55 does not co-rotate.

Here, after reaching a position of about 45°, the lowest disk is co-rotated right at the beginning by contact with the adjacent lateral area 47 (cf. figure b) and pushed toward the quasi-open position (cf. figure c). If, then, rotation again takes place in the open direction with the upper three disks, then the lowest two disks once more lock via the projections 35 and the blocking area 51 (cf. figure d).

As a result of the shape of the disks, it is accordingly ensured that never more than an entire cycle has to be run through until blocking is ensured, a higher torque is accordingly measured on the drive motor of the disks and thus diagnosis about the operating state of the slat package is possible via the motor.

FIG. 18 shows a further exemplary embodiment of a radiator shutter, this time with five slats. In a perspective view of the motor 12, the mounting of the slats can be seen. The motor drives the slat on the far right, which means the slat 11a, directly on its axis of rotation, and the four following slats arranged further on the left are co-rotated via a coupling rod 7 in a way analogous to the exemplary embodiments already described when the motor sets the first slat 11 a rotating. The closed position is illustrated. The entire radiator shutter is arranged on a mounting plate 68 here for illustrative purposes; it would normally be mounted in a housing in a component connected upstream of the engine.

Figures 19, 20:
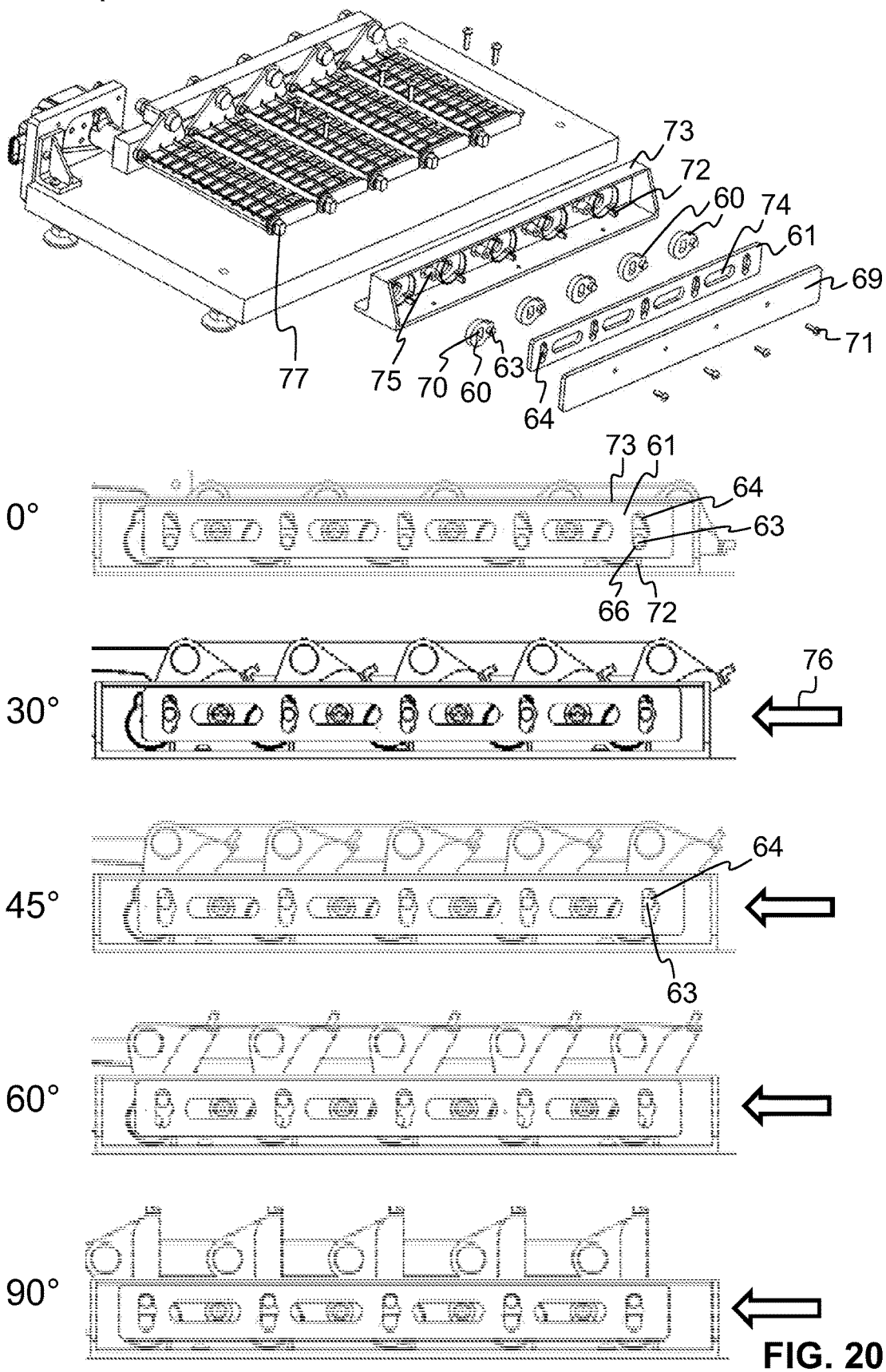
FIGS. 19 a) and 19 b) show the radiator shutter according to FIG. 18, this time in a perspective view of the locking side, in a) the assembled state without a covering and in b) an exploded illustration with regard to locking.
FIG. 20 shows the behavior of the locking rod during the rotation of the slats from the closed position (at the very top) into the open position (at the very bottom) for various angular positions.

Provided opposite the motor 12 is a locking housing 67, in which the bearing pins opposite the drive side of the slats 8-11 a are mounted. In FIG. 19 *a*) in this locking housing 67, the covering plate 69 has been removed (cf. exploded view according to FIG. 19*b*), so that the view into this locking housing 67 is exposed. In the locking housing, the locking rod 61 extending transversely to the plane of the slats can now be seen; this locking rod can be displaced only parallel to the plane which is covered by the axes of the slats and perpendicular to the direction of extension of the slat axes in the housing 67.

At the height of each slat there is a locking recess 64 extending perpendicularly and toward the main direction of extension of the locking rod 61. Engagement pins 63 engage in these locking recesses 64. These engagement pins 63 are arranged on rotary plates 60. These rotary plates 60 have a receiving opening 70; they are pushed with this receiving opening 70 onto the bearing pins of the slats so as to be secured against rotation. In these rotary plates 60, the engagement pin 63 is in each case arranged eccentrically with respect to the axis of rotation of the slat, and the rotary plates 60 co-rotate with the slats, for example as a result of a form-fitting connection between the respective bearing pin 77 and the respective receiving opening 70.

All the rotary plates 60 are aligned with their engagement pins 63 in the same direction and, in each rotary plate 60, the engagement pin 63 points from the slats in the direction toward the locking rod 61.

For the improved guidance of the locking rod 61, the latter has parallel slots 74 extending along its main direction of extension between the locking recesses 64 for the engagement pins 63. Guide pins 75, which are provided on the rear wall of the housing, slide in these slots 74.

Provided on the lower wall of the housing are lower guide webs 72, and the locking rod 61 is caught between this upper housing wall 73 and the guide webs 72 such that it can be displaced only along the displacement direction indicated in FIG. 20, and in the opposite direction. However, it is freely displaceable in this housing in this one direction.

FIG. 20 now illustrates how, if all the slats are intact and none is broken, the various components move relative to one another. Right at the top, 0° shows the closed situation, the slat on the far left is driven by the motor. If, then, the slats are rotated into the open position at 30°, the guide pins 63 all move synchronously upward and, in the counter-clockwise direction, they describe a quarter circle as far as the fully open position. At 30°, there is only a little displacement in the displacement direction 76 but then, at 45° and during the further rotation beyond 60° to 90°, the locking rod 61 is carried along in the displacement direction 76. During closure, the same takes place again in the converse direction, which means that the engagement pins 63 describe a quarter circle in the clockwise direction. The locking rod 61 is carried along in the left-hand direction in this figure during the movement from 0-90°, the engagement pins 63 moving from a position at the very bottom in the corresponding locking recess 64 to the very top.

Figure 21:
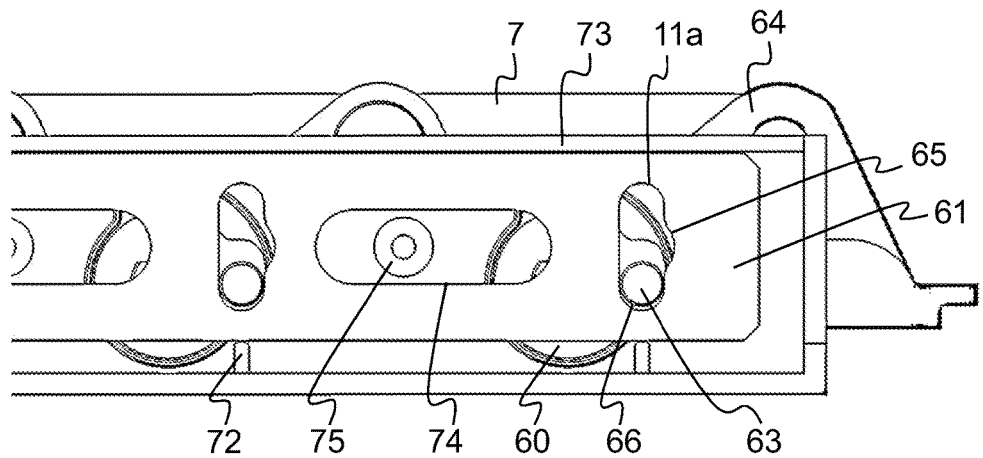
FIGS. 21 a) to 21 c) show in a) the starting position in the closed position, in b) the locking if the slat on the far right is broken and does not co-rotate, starting from the entirely closed position, and in c) starting from a slightly open position.
Figure 21:
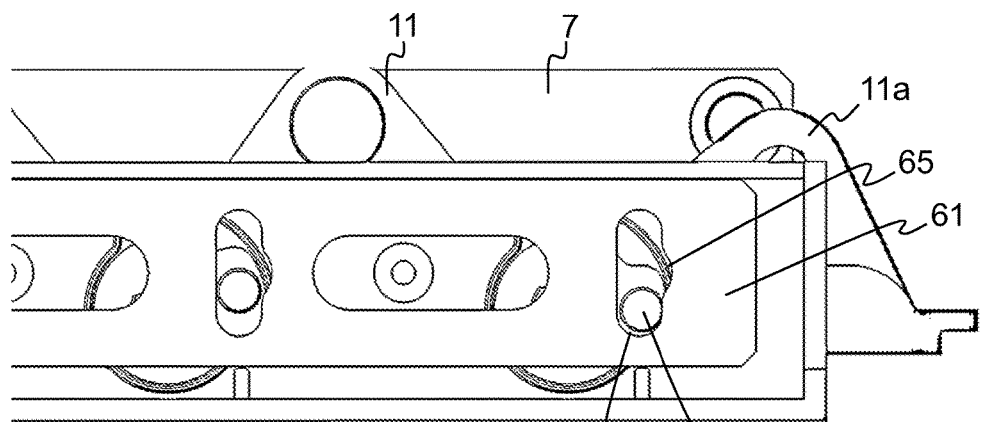
Figure 21:
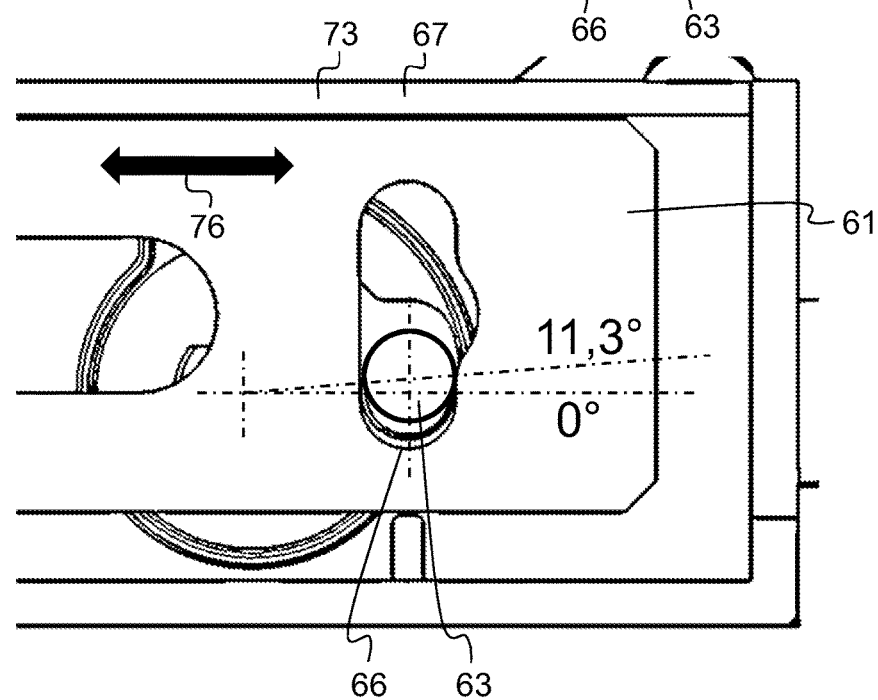

In FIG. 21a, the starting situation is now illustrated for the case in which the slat 11a, which means the slat on the far right, is broken. A start is made in the fully closed position at 0° shown here, the engagement pins 63 are each located in the locking recess 64 in a lower end region 66 which, so to speak, forms a stop but which is normally not reached.

If, then, as is shown in FIG. 21b, the slat package is rotated via the motor but the broken slat 11a does not co-rotate, then the engagement pins 63 of the intact slats move upward into the locking recesses 64 and begin to carry along the locking rod 61 to the left. Since the broken slat 11a shown on the far right here does not co-rotate, its engagement pin 63 remains at the very bottom in the end region 66 of its locking recess 64 and, since the right-hand circumferential area of the engagement pin then comes into clamping contact with the inner contour of the locking recess immediately underneath the catch depression 65, the locking rod 61 cannot now be displaced further to the left, and therefore the engagement pins 63 of the slats arranged further on the left are also prevented from their further rotation, and therefore so are the corresponding slats. The motor 12 is thus blocked and consequently it is detected that a slat is broken.

This locking functions when starting from the fully closed position up to a deflection angle of about 11.3°, as illustrated in FIG. 21c. In other words, as long as the broken slat is located in the area between 0° and about 11° as a starting position, locking takes place, as is shown in FIGS. 21b and c.

If a start is made from a starting position of 30°, then, as can be seen in FIG. 22, the broken slat remains in this position, is then so to speak caught in the catch depression 65, whereupon the slats indicated at 45° further on the left can no longer co-rotate, and therefore the entire slat package is blocked.

FIG. 23 shows the situation of the entire package when the slat on the far right, which means the slat 11a, is broken and a start is made from the closed situation, as has already been mentioned above. At most, the slat package can then be rotated as far as the position at 15° illustrated at the bottom since, in this position, the further displacement of the locking rod to the left is blocked by the engagement pin 63 of the slat 11a on the far right.

Figure 24:
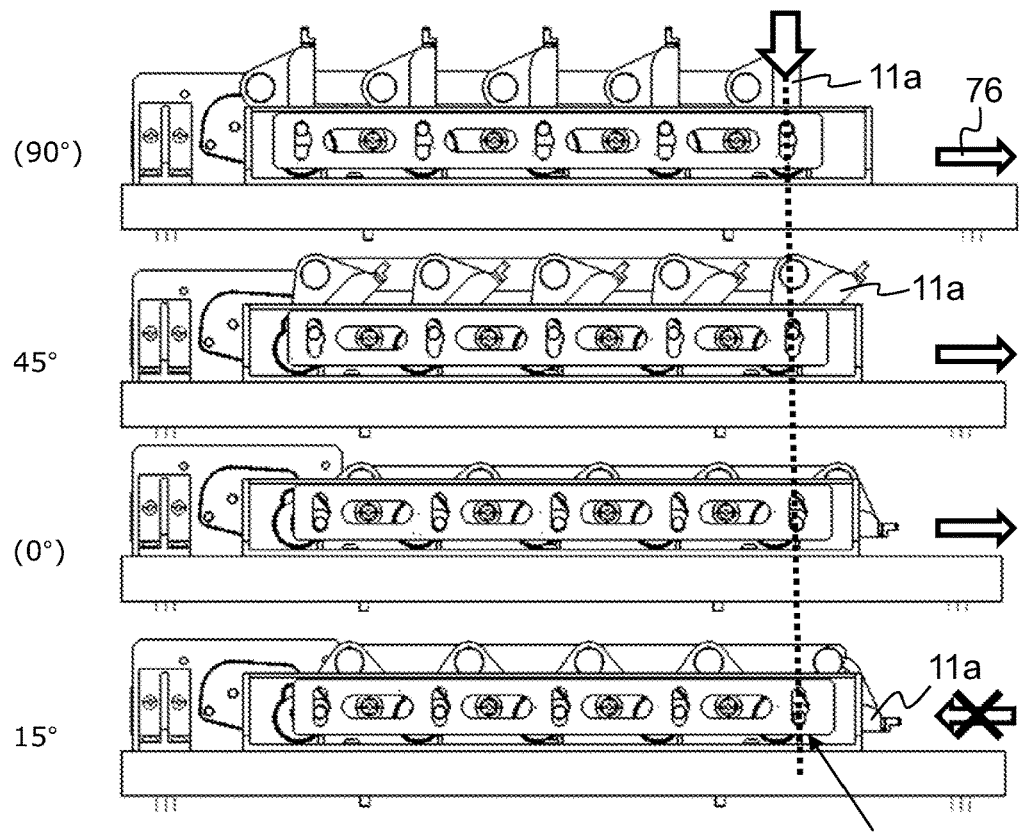
FIG. 24 shows the locking when the slat on the far right is broken and the fully open position is assumed.

FIG. 24 illustrates the situation in which the slat on the far right, which means the slat 11a, is broken and a start is made from the fully open position. Here, all the slats co-rotate, even the broken one, until the fully closed position of 0° is reached. Only when the package is to be opened again in a next opening operation is the system blocked, once more at 15°, as has been explained in conjunction with FIG. 23.

Figure 25:
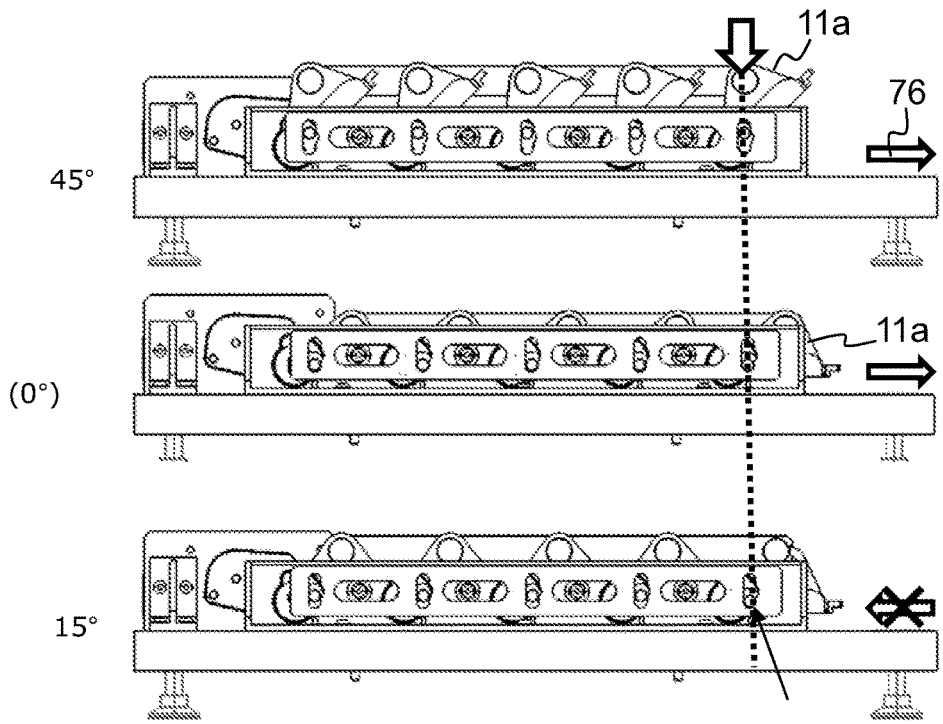
FIG. 25 shows the locking when the slat on the far right is broken and a move is made from the half open position (45°) in the closing direction.

FIG. 25 shows the situation when a start is made from the half open position (at the top) of 45° and the slat package is closed. Here, too, firstly the broken slat is carried along as far as the closed state (0°) and only when the slat package is to be opened again subsequently does the broken slat 11a lock the system at 15°, as has already been described in conjunction with FIG. 23.

Last but not least, FIG. 26 shows the situation in which a start is made from a half open position, here 42.5°, and the slat package is to be opened further. Here, likewise, first of all the broken slat on the far left, 11a, is carried along until the fully open position and only when it has been closed fully once more or at least closed to a position of 30° and is then opened again is the locked position shown at the bottom in FIG. 26 reached.

FIGS. 27 a) and 27 b) show alternative configurations of locking rods 61. FIG. 27a) shows a side view of an implementation in which the locking recesses 64 are not formed as simple vertical slots with a lateral catch depression 65, the locking recesses 64 here have a lateral offset 79 between the lower end region 66 and the upper end region 78. The offset 79 has the same action as the catch depression 65 if a slat stops at 0° (cf. FIGS. 21 a) to 21 c)) and the analogous action to the catch depression 65 if a slat stops at 30° (cf. FIG. 22).

The advantage of the design with the lateral offset 79 consists firstly in that the engagement pin 63 is guided laterally at all times in the slotted guide of the locking recess 64 and never has any play. A further advantage consists in the fact that, compare the situation in FIG. 22 for illustration, wherein a corresponding locking recess with offset must be imagined, starting from a blockage of a slat at 90° or at 45°, even further depending on the height of the offset, and during an attempted rotation of the further slats in the direction of 0°, the result is likewise locking and a corresponding feedback of a fault to the motor.

A further alternative configuration of a locking rod 61 is illustrated in FIGS. 27 b and c. In order that the slats can be inserted following the insertion of the locking rod 61 (cf. also FIGS. 28 a) to 28 d)), it may be advantageous if the locking recesses 64 are open at the top or bottom. The open side is then closed by a further component (in FIGS. 28 a) to 28 d), the covering). In addition, it is not necessary that the locking recesses 64 are configured as passage openings. They can also be formed as grooves, as is illustrated in conjunction with this embodiment, i.e. on the side facing away from the slats, the locking rod 61 has a closed rear wall 81 or a groove base. For stability reasons, in particular when the locking recesses 64 are open on one side, this may be advantageous.

Figure 28:
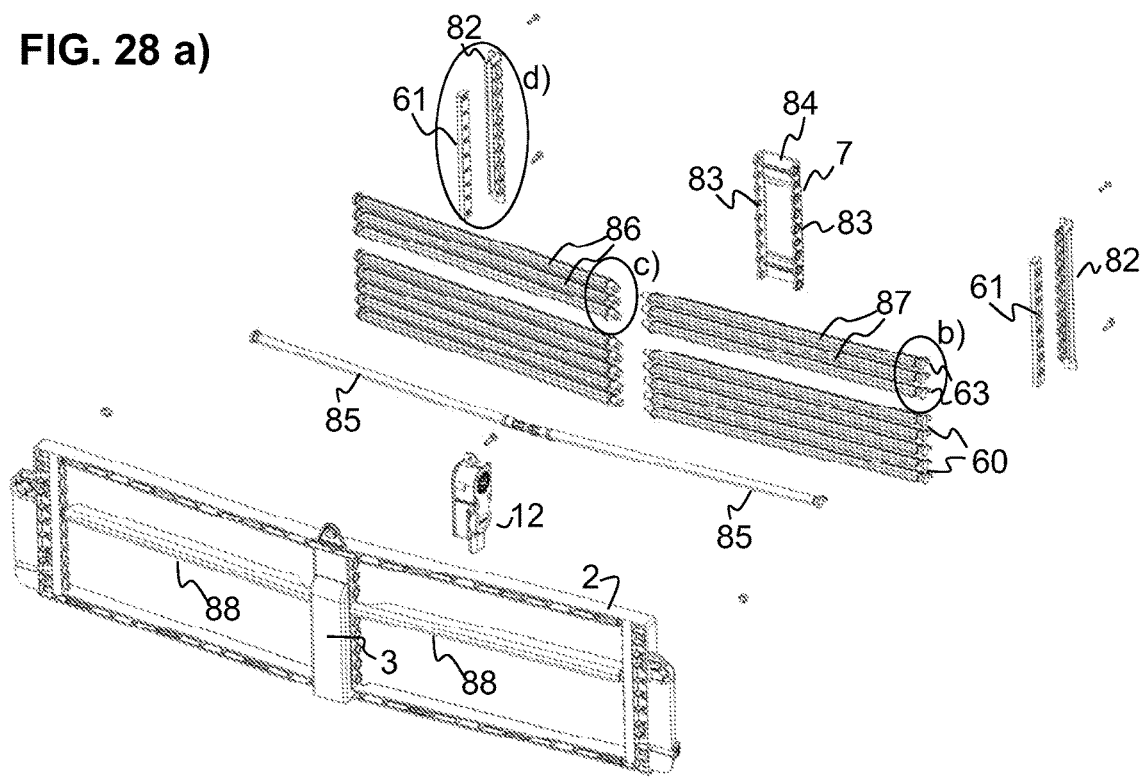
FIGS. 28 a) to 28 d) show a further radiator shutter with locking elements, wherein in a) an exploded illustration is reproduced, and in b) and c) according to the details in a), details of the slats on the side of the locking rod and respectively on the motor side and, in d) according to the detail in a), details relating to the relative arrangement and configuration of the locking rod and covering.
Figure 28:
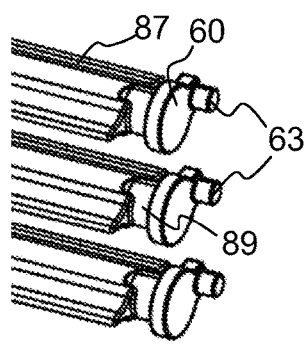
Figure 28:
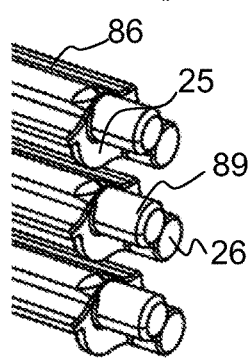
Figure 28:
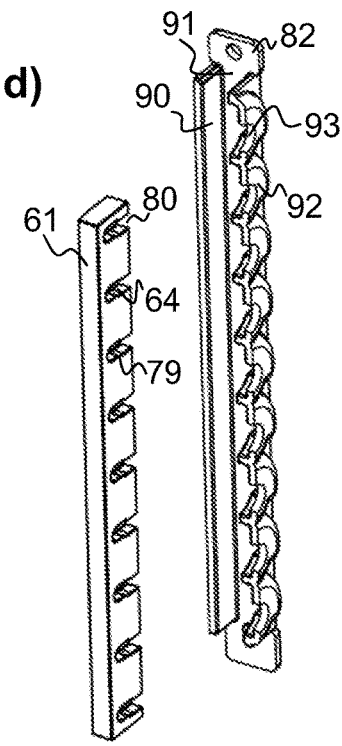

FIGS. 28 a) to 28 d) show a further radiator shutter with locking elements. In this case, two slat packages are driven and controlled via a centrally arranged motor 12. The frame 2 here has a vertical intermediate web 3, which is used not only for the mounting of the slats already described above but also to receive the motor 12. As opposed to the above-described examples, the slats do not extend over the entire width of the frame either, instead two individual slat packages are arranged in the two recesses arranged at the sides of the vertical intermediate web, a first group of slats 86 in the left-hand area as shown, and a second group of slats 87 in the right-hand area as shown.

The motor 12, arranged so as to be protected behind the vertical intermediate web 3 in the direction of travel, drives the two slat packages 86/87 jointly and synchronously, in that the motor drives a slat or a transmission shaft 85 (see the discussion further below), and the further slats are moved via the common coupling element 7. For this purpose, the coupling element 7 has two coupling areas 83 and a bridging area 84 located in between. The locking elements already described above are each provided on the outer side in the frame, once more in the form of a respective locking rod 61, via rotary plates 60, which are provided on the respective slat 86/87, with eccentric engagement pins 63 fixed thereto or formed in one piece therewith. These engagement pins 63 engage in the grooves of the locking rod 61, each being a locking rod 61 as has already been described further above in conjunction with FIGS. 27 b) and c). In other words, it is a locking rod 61 in which the grooves are open upward or, better here, open to the rear in the direction of travel. This design permits the frame to be populated from behind, so to speak, in that firstly the locking rods 61 are inserted, then the slats and, at the end, are closed via the coverings 82 which, for example, are fixed by the screws illustrated. Here, too, the locking rods are then mounted such that they can be displaced only along their main direction of extension.

Given such slat packages with comparatively many slats, for reasons of weight and for reasons of the greatest possible flow cross-section with the slats open, a thin configuration of the slats is preferred. This can lead to the torsional stability of the slats no longer being sufficient if a slat fails and blocks. It is then possible that although the rotation of the slats is blocked on the side facing away from the motor, this blocking is not conducted to the motor side and therefore as feedback to the motor, since the slats can simply be rotated by the motor.

In this exemplary embodiment, this problem is solved in that in the frame 2 there is a respective horizontal intermediate web 88, which is arranged at the same height as the slats. Arranged at the vertical height of this intermediate web 88 and protected behind the latter on both sides in the frame, there is not a slat but a transmission shaft 85, which has a sufficient torsional stability. This transmission shaft 85 is likewise coupled to the locking rod 61 in the same way as the slats, and if blocking is carried out via the locking rod 61, then this transmission shaft 85 is also blocked. Then, either this transmission shaft 85 is also in particular that element which is coupled to the motor 12 and actuates the coupling rod 7, then the feedback is passed back directly to the motor in the event of a blockage. If the transmission shaft 85 is not coupled directly to the motor but via the coupling rod 7, then the feedback takes place indirectly via this coupling rod 7. However, appropriate safeguarding of the feedback can also be carried out in another way, for example by one slat being formed specifically with regard to torsional stability.

FIG. 28 *b*) shows, in a detail according to the detail in a), the detailed configuration of the side of the slats 87 on which the rotary plates 60 are arranged. The rotary plates 60 are in this case formed in one piece with the slats 87 and connected to the latter via the bearing pins 89. A respective engagement pin 63 is provided eccentrically in the respective rotary plate 60.

FIG. 28 *c*) shows, in a detail according to the detail in a), the detailed configuration of the side of the slats 86 in which the coupling to the motor 12 is made. The bearing pins 89 are arranged on the shaft and mounted in corresponding recesses in the vertical intermediate web 3 of the frame 2. A respective coupling pin 26, which engages in corresponding recesses in the coupling rod 7, is provided via a coupling lever 25. Here, too, the coupling lever and coupling pin are formed in one piece with the slat.

FIG. 29 *d*) shows, in a detail according to the detail in FIG. 28 *a*), the locking rod 61 having the locking recesses 64 which, in this illustration, are formed so as to be open at the rear with an insertion opening 80 and which have a lateral offset 79 approximately halfway up, as described above. The covering 82 is put on this locking rod 61 and then connected to the frame. The covering 62 has a rear wall 90, which guides the locking rod 61 on this side, and a covering wall 91 which closes the upper insertion opening 80 when the covering is put on and is fixed to the frame. In the front wall of this covering facing the slats, there are now contours 92, in each of which recesses 93 for the bearing pins 89 are provided, and behind which the rotary plates 60 of the slats are caught. These contours ensure that, should a slat break, this then breaks in the area of the corresponding bearing pin 89 between the actual slat and the rotary plate 60 and therefore, even with a broken slat, the rotary plate remains in the frame and ensures the coupling to the locking rod 61. Without this measure, it would be possible for a slat to break together with the rotary plate and accordingly then for no more locking to be able to be carried out via the locking rod 61, since a rotary plate no longer co-rotates.

LIST OF REFERENCE SIGNS

| | |
|---|---|
| 1 | Radiator shutter |
| 2 | Frame |
| 3 | Vertical intermediate web |
| 4 | Lateral fastening area of 2 |
| 5 | Bearing area of 2 |
| 6 | Motor area of 6 |
| 7 | Coupling rod |
| 8 | First slat |
| 8' | Bearing pin of 8 |
| 8" | Intermediate bearing of 8 |
| 8'" | Bearing head of 8 |
| 9 | Drive slat |
| 9' | Bearing pin of 9 |
| 9" | Intermediate bearing of 9 |
| 9'" | Bearing head of 9 |
| 10 | Third slat |
| 10' | Bearing pin of 10 |
| 10" | Intermediate bearing of 10 |
| 10'" | Bearing head of 10 |
| 11 | Fourth slat |
| 11' | Bearing pin of 11 |
| 11" | Intermediate bearing of 11 |
| 11'" | Bearing head of 11 |
| 11a | Fifth slat |
| 12 | Motor |
| 13 | Drive-side mounting of 8-11 |
| 14 | Non-drive-side mounting of 8-11 |
| 15 | Motor holder |
| 16 | Covering of 3 |
| 17 | Covering area of slat, slat leaf |
| 18 | OBD disk of 8 |
| 19 | OBD disk of 9 |
| 20 | OBD disk of 10 |
| 21 | OBD disk of 11 |
| 22 | Encapsulated space for 18-21 |
| 23 | Partition wall of 22 |
| 24 | Coupling groove in 7 |
| 25 | Coupling lever of slat |
| 26 | Coupling pin on 25 |
| 27 | Passage opening for bearing pin in 23 |
| 28 | Shaft of 18-21 |
| 29 | Guide collar |
| 30 | First locking plate of 18-21 |
| 31 | Second locking plate of 18-21 |
| 32 | Sweeping area of 30 |
| 33 | Incision area of 30 |
| 34 | Capped areas because of prototype construction |
| 35 | Lateral projections on 31 |
| 36 | Minimum spacing |
| 37 | Frame opening |
| 38 | Mirror plane |
| 39 | Reinforcements |
| 40 | Axial hole |
| 41 | Planar flank for preventing rotation |
| 42 | Recess |
| 43 | Sliding webs |
| 44 | Circumferential flange on the side of the second locking plate |
| 45 | Circumferential flange on the side of the first locking plate |
| 46 | Blocking area of 30 |
| 47 | Lateral area of 30 |
| 48 | Incision area of 30 |
| 49 | Transition area of 30 |
| 50 | Circularly cylindrical area of 31 |
| 51 | Blocking area of 31 |
| 52 | First transition area of 31 |
| 53 | Second transition area of 31 |
| 54 | Blocking collision |

-continued

LIST OF REFERENCE SIGNS

| | |
|---|---|
| 55 | "Failed" OBD disk |
| 56 | Contact without locking |
| 60 | Rotary plate |
| 61 | Locking rod |
| 62 | Locking guide, locking housing |
| 63 | Engagement pin |
| 64 | Locking recess in 61 |
| 65 | Catch depression |
| 66 | Lower end region of the locking recess |
| 67 | Locking housing |
| 68 | Mounting plate |
| 69 | Covering plate |
| 70 | Receiving opening in 60 for bearing pins of slat |
| 71 | Fastening screws |
| 72 | Lower guide webs |
| 73 | Upper housing wall |
| 74 | Parallel slot for guidance |
| 75 | Guide pin for engagement in 74 |
| 76 | Displacement direction of locking rod |
| 77 | Bearing pin of the slat |
| 78 | Upper end region of the locking recess |
| 79 | Lateral offset of the locking recess |
| 80 | Upper insertion opening of the locking recess |
| 81 | Closed rear wall of locking recess |
| 82 | Covering |
| 83 | Coupling area of 7 |
| 84 | Bridging area of 7 |
| 85 | Transmission shaft |
| 86 | Slats of the left-hand area |
| 87 | Slats of the right-hand area in general |
| 88 | Horizontal intermediate web |
| 89 | Bearing pin of 86/87 |
| 90 | Rear wall of 82 |
| 91 | Covering wall of 82 |
| 92 | Contours in the front wall of 82 for receiving 60 |
| 93 | Recess in 92 for 89 |
| EV | First locking plate, 30 |
| ZV | Second locking plate, 31 |

The invention claimed is:

1. A radiator shutter, for a motor vehicle, for the controlled ventilation of the engine,
having a frame in which at least two slats are rotatably mounted in such a way that they can be pivoted from
a closed position, in which the leaves of the slats are arranged substantially parallel to the plane of the frame and, in the area in which they adjoin one another, either partly overlap or rest tightly on one another, so that the frame opening is substantially closed for the flow of air,
into an open position, in which the leaves of the slats are arranged substantially perpendicular to the plane of the frame, so that the frame opening is substantially opened to the maximum for the flow of air,
wherein the slats are mounted in bearing points on two opposite sides of the frame,
wherein, in or on the frame, a motor which drives a single slat is provided on a motor side of the frame, and wherein, on the same motor side of the frame, a coupling element is provided which transmits the rotation of the driven slat synchronously to the further slats,
wherein a locking element is provided for each slat on the mounting side of the frame facing away from the motor side of the frame, in the area of the mounting of the slats provided there, and wherein the locking elements are coupled directly or indirectly in such a way that, if at least one of the locking elements does not rotate synchronously with all the other locking elements, the rotational movement of the locking elements is blocked in at least one direction,
wherein the locking elements have at least one engagement pin offset radially with respect to the axis of rotation of the slats, which extends parallel to the axis of rotation of the slats and, during rotation of the slats, completes an arcuate movement synchronously with the latter, and the engagement pins of all the locking elements are coupled via a common locking rod extending perpendicular to the axis of the slats,
wherein the engagement pins run in locking recesses in the locking rod, and
wherein:
the engagement pins are deflected substantially to the maximum extent in the closed position or in the open position in a main direction of extension of the locking rod with respect to the axis of rotation of the respective slat, and, during the rotation into the open position or the closed position, rotate into a position located in the main direction of extension of the locking rod, substantially at a height of the axis of rotation of the respective slat, or
the locking rod is guided in a locking guide in such a way to be displaced only in a single direction perpendicular to axes of rotation of the slats but not in a direction of the normal to the plane which is covered by the axes of rotation of the slats.

2. The radiator shutter as claimed in claim 1, wherein on the mounting side of the frame facing away from the motor side of the frame, in the area of the mounting of the slats provided there, a locking disk is provided for each slat, and wherein the locking disks have a form which, if at least one of the locking disks does not rotate synchronously with all the other locking disks, the rotational movement of the locking disks is blocked in a force-fitting and/or form-fitting manner.

3. The radiator shutter as claimed in claim 1, wherein the respective locking element is coupled with the associated slat in both directions of rotation.

4. The radiator shutter as claimed in claim 1, wherein the locking elements are formed as components separate from the slats.

5. The radiator shutter as claimed in claim 1, wherein the locking elements and said locking rod are arranged in an encapsulated area of the frame which is separated by a partition wall from the passage opening of the frame.

6. The radiator shutter as claimed in claim 1, wherein the slats have a length of at least 10 cm or at least 20 cm or at least 50 cm.

7. The radiator shutter as claimed in claim 6, wherein the slats have a production-related cavity in the interior extending along the axis of the respective slat.

8. The radiator shutter as claimed in claim 1, wherein the coupling element is formed as a coupling rod.

9. A method for operating or controlling a radiator shutter as claimed in claim 1, wherein the controller of the motor is designed such that an error message is output if the motor moves to a locked stop position because of locking of the locking elements, which does not correspond to the closed or the open position of the slats.

10. A method according to claim 9, wherein the controller of the motor is designed such that an error message is output if the motor moves to a locked stop position because of locking of the locking elements in the form of locking disks or locking rods, which does not correspond to the closed or the open end position of the slats, wherein the fact that such a locked stop position has been reached is detected via an increase in the torque generated by the motor.

11. A method for producing a radiator shutter as claimed in claim 1, wherein the frame, slats and the locking elements are produced individually from a thermoplastic material in an injection molding process and are then assembled to form the radiator shutter.

12. A method as claimed in claim 11, wherein the frame, slats and the locking elements in the form of locking rods, are produced individually from a thermoplastic material, from a glass fiber-reinforced thermoplastic material, in including from glass fiber-reinforced thermoplastic polyamide in an injection molding process, and are then assembled to form the radiator shutter.

13. Method of using a radiator shutter as claimed in claim 1 in a motor vehicle, for specific air supply to an engine, an engine component, an energy store or another heat-generating component.

14. The radiator shutter as claimed in claim 1, wherein the rotational movement of the locking elements is blocked in a force-fitting and/or form-fitting manner.

15. The radiator shutter as claimed in claim 1, wherein the slats have a length in the range from 1.2-2 m, and wherein a vertical intermediate web which supports intermediate mounting regions of the slats is provided in the frame.

16. The radiator shutter as claimed in claim 1, wherein the coupling element is formed as a coupling rod, wherein the motor drives the driven slat directly via their axle, and the coupling rod, which is arranged parallel to the plane of the frame and perpendicular to the axes of the slats, is moved via a coupling lever, and the other slats are moved synchronously via corresponding coupling levers coupled to the coupling rod.

17. A radiator shutter, for a motor vehicle, for the controlled ventilation of the engine, having a frame in which at least two slats are rotatably mounted in such a way that they can be pivoted from
- a closed position, in which the leaves of the slats are arranged substantially parallel to the plane of the frame and, in the area in which they adjoin one another, either partly overlap or rest tightly on one another, so that the frame opening is substantially closed for the flow of air,
- into an open position, in which the leaves of the slats are arranged substantially perpendicular to the plane of the frame, so that the frame opening is substantially opened to the maximum for the flow of air,
- wherein the slats are mounted in bearing points on two opposite sides of the frame,
- wherein, in or on the frame, a motor which drives a single slat is provided on a motor side of the frame, and wherein, on the same motor side of the frame, a coupling element is provided which transmits the rotation of the driven slat synchronously to the further slats,
- wherein a locking element is provided for each slat on the mounting side of the frame facing away from the motor side of the frame, in the area of the mounting of the slats provided there, and wherein the locking elements are coupled directly or indirectly in such a way that, if at least one of the locking elements does not rotate synchronously with all the other locking elements, the rotational movement of the locking elements is blocked in at least one direction,
- wherein the locking elements have at least one engagement pin offset radially with respect to an axis of rotation of the slats, which extends parallel to the axis of rotation of the slats and, during rotation of the slats, completes an arcuate movement synchronously with the latter, and the engagement pins of all the locking elements are coupled via a common locking rod extending perpendicular to the axis of the slats, and
- wherein the engagement pins run in locking recesses in the locking rod, which are configured as an elongated slot or elongated recess, or as an elongated groove, of which the longer axis extends perpendicular to the main direction of extension of the locking rod, and wherein the locking rod is further mounted in such a way that it can be displaced substantially only along its main direction of extension but not in a direction perpendicular thereto.

18. The radiator shutter as claimed in claim 17, wherein the engagement pins are deflected substantially to the maximum extent in the closed position or in the open position in the main direction of extension of the locking rod with respect to the axis of rotation of the respective slat, and, during the rotation into the open or the closed position, rotate into a position in which they are located in the main direction of extension of the locking rod, substantially at the height of the axis of rotation of the respective slat, and wherein, in the open or closed position, the engagement pins each come to lie in an end region of the elongated slot or the elongated recess,
- wherein the slot or the elongated recess each has a catch depression or a lateral offset in the direction of the maximum deflection of the engagement pins, halfway up the elongated slot or the elongated recess.

* * * * *